(12) United States Patent
Frazzoli et al.

(10) Patent No.: US 9,645,577 B1
(45) Date of Patent: May 9, 2017

(54) FACILITATING VEHICLE DRIVING AND SELF-DRIVING

(71) Applicant: nuTonomy Inc., Cambridge, MA (US)

(72) Inventors: Emilio Frazzoli, Cambridge, MA (US); Karl Iagnemma, Washington, DC (US)

(73) Assignee: nuTonomy Inc., Cambridge, MA (US)

( * ) Notice: Subject to any disclaimer, the term of this patent is extended or adjusted under 35 U.S.C. 154(b) by 0 days.

(21) Appl. No.: 15/078,143

(22) Filed: Mar. 23, 2016

(51) Int. Cl.
*G05D 1/02* (2006.01)

(52) U.S. Cl.
CPC ......... *G05D 1/0214* (2013.01); *G05D 1/0231* (2013.01); *G05D 1/0251* (2013.01); *G05D 1/0257* (2013.01); *G05D 1/0268* (2013.01); *G05D 1/0278* (2013.01); *G05D 1/0285* (2013.01)

(58) Field of Classification Search
None
See application file for complete search history.

(56) References Cited

U.S. PATENT DOCUMENTS

| | | | |
|---|---|---|---|
| 6,151,539 A | 11/2000 | Bergholz et al. | |
| 8,437,890 B2 | 5/2013 | Anderson et al. | |
| 8,543,261 B2 | 9/2013 | Anderson et al. | |
| 8,744,648 B2 | 6/2014 | Anderson et al. | |
| 9,097,549 B1 | 8/2015 | Rao et al. | |
| 9,120,485 B1 | 9/2015 | Dolgov | |
| 2007/0001831 A1* | 1/2007 | Raz | B60R 16/0231 340/439 |
| 2008/0303696 A1* | 12/2008 | Aso | G08G 1/161 340/935 |
| 2010/0228427 A1 | 9/2010 | Anderson et al. | |
| 2015/0292894 A1 | 10/2015 | Goddard et al. | |
| 2015/0345966 A1 | 12/2015 | Meuleau | |
| 2015/0345967 A1 | 12/2015 | Meuleau | |
| 2015/0345971 A1 | 12/2015 | Meuleau et al. | |

(Continued)

FOREIGN PATENT DOCUMENTS

| | | |
|---|---|---|
| WO | WO2014/139821 | 9/2014 |
| WO | WO2015/008032 | 1/2015 |

OTHER PUBLICATIONS

Karaman et al., "Sampling-based Algorithms for Optimal Motion Planning with Deterministic ■—Calculus Specifications", 2012 American Control Conference, Jun. 27-Jun. 29, 2012. 8 pages.

(Continued)

*Primary Examiner* — Angela Ortiz
*Assistant Examiner* — Garrett Evans
(74) *Attorney, Agent, or Firm* — Fish & Richardson P.C.

(57) ABSTRACT

Among other things, an operation related to control of a vehicle is facilitated by actions that include the following. A finite set of candidate trajectories of the vehicle is generated that begin at a location of the vehicle as of a given time. The candidate trajectories are based on a state of the vehicle and on possible behaviors of the vehicle and of the environment as of the location of the vehicle and the given time. A putative optimal trajectory is selected from among the candidate trajectories based on costs associated with the candidate trajectories. The costs include costs associated with violations of rules of operation of the vehicle. The selected putative optimal trajectory is used to facilitate the operation related to control of the vehicle.

30 Claims, 13 Drawing Sheets

(56) References Cited

U.S. PATENT DOCUMENTS

2015/0348112 A1   12/2015  Ramanujam
2016/0075333 A1    3/2016  Sujan et al.

OTHER PUBLICATIONS

Paulo Tabuada and George J Pappas. Linear time logic control of discrete-time linear systems. *IEEE Transactions on Automatic Control*, 51(12):1862-1877, 2006.

Michael Sipser. *Introduction to the Theory of Computation*. Course Technology, 3rd edition, 2012.

O. Amidi and C. E. Thorpe, "Integrated mobile robot control," International Society for Optics and Photonics, Boston, MA, 1991, pp. 504-523.

Aoude, Georges, Joshua Joseph, Nicholas Roy, and Jonathan How. "Mobile agent trajectory prediction using Bayesian nonparametric reachability trees." In Proceedings of AIAA Infotech@ Aerospace (2011): 1587-1593.

Aguiar, J. P. Hespanha, and P. V. Kokotovic, "Path-following for nonminimum phase systems removes performance limitations," Automatic Control, IEEE Transactions on, vol. 50, No. 2, pp. 234-239, 2005.

'Bosch-presse.de' [online]. "Connected horizon—seeing beyond the bends ahead," Oct. 9, 2015, [retrieved on Nov. 11, 2016]. Retrieved from the Internet: URL< http://www.bosch-presse.de/pressportal/en/connected-horizon--seeing-beyond-the-bends-ahead-35691.html>. 2 pages.

Amidi, "Integrated Mobile Robot Control," International Society for Optics and Photonics, 1991, 504-523.

Andrea-Novel et al., "Control of Nonholo-nomic Wheeled Mobile Robots by State Feedback Linearization," The International Journal of Robotics Research, 1995, 14: 543-559.

Baier and Katoen, "Principles of Model Checking," The MIT Press, 2008, 994 pages.

En.wikipedia.org [online] "Gain Scheduling", Sep. 2006, [retrieved on Aug. 25, 2016]. Retrieved from the internet: URL< https://en.wikipedia.org/wiki/Gain_scheduling>. 1 page.

Franke et al., "Autonomous Driving approaches Downtown," IEEE Intelligent Systems, 1999, 1-14.

Golovinsky et al., "Shape-based Recognition of 3D Point Clouds in Urban Environments," Proceedings of the 12th International Conference on Computer Vision, 2009, 2154-2161.

He et al., "Color-Based Road Detection in Urban Traffic Scenes," Dec. 2004, 5: 309-318.

Kanayama, "A Stable Tracking Control Method for an Autonomous Mobile Robot," International Conference on Robotics and Automation, 1990, 384-389.

Kessels et al., "Electronic Horizon: Energy Management using Telematics Information", Vehicle Power and Propulsion Conference, 2007. VPPC 2007. IEEE, 6 pages.

Manna and Pnueli, "Temporal Verification of Reactive Systems," Springer Science and Business Media, 1995, 525 pages.

Rankin et al., "Autonomous path planning navigation system used for site characterization," International Society for Optics and Photonics, 1996, 176-186.

Shen et al., A Robust Video based Traffic Light Detection Algorithm for Intelligent Vehicles, Proceedings of the IEEE Intelligent Vehicles Symposium, 2009, 521-526.

Karaman et al., "Sampling-based algorithms for optimal motion planning." Int. Journal of Robotics Research, http://ares.lids.mit.edu/papers/Karaman.Frazzoli.IJRR11.pdf, 30(7):846-894, Jun. 2011.

Castro, Luis L Reyes, et al., "Incremental Sampling-based Algorithm for Minimum-violation Motion Planning", http://arxiv.org/pdf/1305.1102.pdf, arXiv: 1305.1102v2 [cs.RO], Nov. 6, 2013 (8 pages).

Chaudari, Pratik, et al., "Incremental Minimum-Violation Control Synthesis for Robots Interacting with External Agents," http://vision.ucla.edu/~pratikac/pub/chaudhari.wongpiromsam.ea.acc14.pdf, 2014 (8 pages).

Autoliv Stereo-vision camera. https://www.autoliv.com/ProductsAndInnovations/ActiveSafetySystems/Pages/VisionSystems.aspx, Retrieved Oct. 20, 2016 from the Internet (2 pages).

Bahlmann, Claw, Ying Zhu, Visvanathan Ramesh, Martin Pellkofer, and Thorstea Koehler. "A system for traffic sign detection, tracking, and recognition using color, shape, and motion information." In Proceedings of the IEEE Intelligent Vehicles Symposium, (2005): pp. 255-260.

Betts, J.T., "Survey of numerical methods for trajectory optimization". AIAA Journal of Guidance, Control, and Dynamics, 21(2):193-207, Mar.-Apr. 1998.

Camacho, E.F. and C. B. Alba, "Model predictive control," Springer Science & Business Media, 2013.

De La Escalera, Arturo, Luis E. Moreno, Miguel Angel Salichs, and Jose Maria Armingol. "Road traffic sign detection and classification." IEEE Transactions on Industrial Electronics, 44, No. 6 (1997): 848-859.

Delphi Electronically Scanning Radar, "Safety Electronics," Active Safety and Delphi Electronically Scanning Radar, http://delphi.com.manufacturers/auto/safety/active/electronically-scanning-radar, retrieved from the Internet on Feb. 7, 2017 (4 pages).

Demiris, Yiannis. "Prediction of intent in robotics and multi-agent systems." Cognitive Processing, 8, No. 3 (2007): 151-158.

Fairfield, Nathaniel, and Chris Urmson. "Traffic light mapping and detection." In Proceedings of the International Conference on Robotics and Automation (ICRA), 2011.

Falcone, M.P. Tufo, F. Borrelli, J. Asgari, and H. E. Tseng, "A linear time varying model predictive control approach to the integrated vehicle dynamics control problem in autonomous systems," in 46th Conference on Decision and Control, pp. 2980-2985, IEEE, 2007.

Franke, Uwe, Dariu Gavrila, Steffen GOrzig, Frank Lindner, Frank Paetzold, and Christian Wöhler. "Autonomous driving goes downtown." IEEE Intelligent Systems and their Applications. 6 (1998): 40-48.

Garcia, C.E., D. M. Prett, and M. Morari, "Model predictive control theory and practice—a survey," Automatica, vol. 25, No. 3, pp. 335-348, 1989.

Gavrila, Dariu M., and Vasanth Philomin. "Real-time object detection for "smart" vehicles." In Proceedings of the Seventh IEEE International Conference on Computer Vision, vol. 1, pp. 87-93, 1999.

Aguiar, A. Pedro and Hespanha, J.P., et al., "Trajectory-tracking and path-following of under-actuated autonomous vehicles with parametric modeling uncertainty," Transactions on Automatic Control, vol. 52, No. 8, pp. 1362-1379, 2007.

Autonomoustuff.com, "ibeo Standard Four Layer Multi-Echo LUX Sensor," Bringing together the World's Best Technologies, http://www.autonomoustuff.com/product/ibeo-lux-standard/, Jul. 2016 (2 pages).

Jiang, Z.P. and H. Nijmeijer, "Tracking control of mobile robots: a case study in backstepping," Automatica, vol. 33, No. 7, pp. 1393-1399, 1997.

Kavraki, L.E., et al., "Probabilistic roadmaps for path planning in high-dimensional configuration spaces." IEEE Transactions on Robotics and Automation, 12(4):566-580, 1996.

Kim, ZuWhan. "Robust lane detection and tracking in challenging scenarios." IEEE Transactions on Intelligent Transportation Systems, 9, No. 1 (2008): 16-26.

Lindner, Frank, Ulrich Kressel, and Stephan Kaelberer. "Robust recognition of traffic signals." In Proceedings of the IEEE Intelligent Vehicles Symposium, 2004.

Maldonado-Bascón, Saturnino, Sergio Lafuente-Arroyo, Pedro Gil-Jimenez, Hilario Gómez-Moreno, and Francisco López-Ferreras. "Road-sign detection and recognition based on support vector machines." IEEE Transactions on Intelligent Transportation Systems, 8, No. 2 (2007): 264-278.

Møgelmose, Andreas, Mohan Manubhai Trivedi, and Thomas B. Moeslund. "Vision-based traffic sign detection and analysis for intelligent driver assistance systems: Perspectives and survey." IEEE Transactions on Intelligent Transportation Systems, 13, No. 4 (2012): 1484-1497.

(56) References Cited

OTHER PUBLICATIONS

Mobileye, Advanced Driver Assistance Systems (ADAS) systems range on the spectrum of passive/active, http://www.mobileye.com/our-technology/adas/, Copyright 2017 (2 pages).
Morris, Brendan Tran, and Mohan Manubhai Trivedi. "Learning, modeling, and classification of vehicle track patterns from live video." IEEE Transactions on Intelligent Transportation Systems, 9.3 (2008): 425-437.
Ollero, A. et al., "Predictive path tracking of mobile robots. application to the CMU Navlab," in 5th International Conference on Advanced Robotics, vol. 91, pp. 1081-1086, 1991.
Premebida, Cristiano, Oswaldo Ludwig, and Uthano Nunes. "LIDAR and vision-based pedestrian detection system." Journal of Field Robotics 26, No. 9 (2009): 696-711.
Premebida, Cristiano, Gonçalo Monteiro, Uthano Nunes, and Paulo Peixoto. "A lidar and vision-based approach for pedestrian and vehicle detection and tracking." In Proceedings of the IEEE Intelligent Transportation Systems Conference, 2007, pp. 1044-1049.
Rankin, A. L., "Autonomous path-planning navigation system for site characterization," in Aerospace/Defense Sensing and Controls, pp. 176-186, International Society for Optics and Photonics, 1996.
Shen, Yehu, Umit Ozguner, Keith Redmill, and Jilin Liu. "A robust video based traffic light detection algorithm for intelligent vehicles." In Proceedings of the IEEE Intelligent Vehicles Symposium, 2009, pp. 521-526.
Wallace, R. et al., "First results in robot road-following.," in IJCAI, pp. 1089-1095, 1985.
Wang, Chieh-Chih, Charles Thorpe, Sebastian Thrun, Martial Hebert, and Hugh Durrant-Whyte. "Simultaneous localization, mapping and moving object tracking." The International Journal of Robotics Research 26, No. 9 (2007): 889-916.
Wang, Yue, Eam Khwang Teoh, and Dinggang Shen. "Lane detection and tracking using B-Snake." Image and Vision Computing 22.4 (2004): 269-280.
Wit, J., et al., "Autonomous ground vehicle path tracking," Journal of Robotic Systems, vol. 21, No. 8, pp. 439-449, 2004.
Yilmaz, Alper, Omar Javed, and Mubarak Shah. "Object tracking: A survey." ACM Computing Surveys 38.4 (2006): 13.
Mayne, D. Q, "Constrained model predictive control: Stability and optimality," Automatica, vol. 36, No. 6, pp. 789-814, 2000.

\* cited by examiner

BLOCK DIAGRAM OF SIMULATOR PROCESS

LOCATIONS OF SYSTEMS SENSING, COMPUTATIONAL COMPONENTS, AND MAP RESOURCES

TRAFFIC SCENARIO AT TIME k

BLOCK DIAGRAM OF SYSTEM OPERATION

FACILITATING VEHICLE DRIVING AND SELF-DRIVING

BACKGROUND

This description relates to facilitating vehicle driving and vehicle self-driving.

Typical driving of vehicles by people and self-driving of vehicles using technology present opportunities and risks. Many of the perils are associated with how the vehicle is driven in light of the state of the vehicle and the state of the environment, including other vehicles and obstacles.

Normally a human driver who is driving a vehicle is able to control its operation so that the vehicle proceeds safely and reliably to a destination on, for example, a road network shared with other vehicles and pedestrians, while complying with applicable rules of the road. For a self-driving vehicle, a sequence of control actions can be generated based on real-time sensor data, geographic data (such as maps), regulatory/normative data (rules of the road), and historical information (such as traffic patterns) to enable the vehicle to proceed in such a manner.

It can be useful to monitor the performance of a human driver of a vehicle for safety and other reasons.

We use the term self-driving vehicles broadly to include, for example, any mobile device designed to carry passengers or objects or both from one or more pick-up locations to one or more drop-off locations, without requiring direct control or supervision by a human operator, for example, without requiring a human operator to be able to take over control responsibility at any time. Some examples of self-driving vehicles are self-driving road vehicles, self-driving off-road vehicles, self-driving cars, self-driving buses, self-driving vans or trucks, drones, or aircraft, among others.

We use the term regulatory data (or sometimes, the term rules of operation) broadly to include, for example, regulations, laws, and formal or informal rules governing the behavior patterns of users of devices, such as road users including vehicle drivers. These include rules of the road as well as best practices and passenger or operator preferences, described with similar precision and depth. We use the term historical information broadly to include, for example statistical data on behavior patterns of road users, including pedestrians, and cyclists, in each case possibly as a function of location, time of day, day of the week, seasonal and weather data, or other relevant features, or combinations of them.

SUMMARY

In general, in an aspect, an operation related to control of a vehicle is facilitated by actions that include the following. A finite set of candidate trajectories of the vehicle is generated that begin at a location of the vehicle as of a given time. The candidate trajectories are based on a state of the vehicle and on possible behaviors of the vehicle and of the environment as of the location of the vehicle and the given time. A putative optimal trajectory is selected from among the candidate trajectories based on costs associated with the candidate trajectories. The costs include costs associated with violations of rules of operation of the vehicle. The selected putative optimal trajectory is used to facilitate the operation related to control of the vehicle.

Implementations may include one or any combination of two or more of the following features. The facilitating of the operation related to control of the vehicle includes applying a feedback control policy associated with the putative optimal trajectory to control elements of the vehicle. Each of the trajectories represents a temporal transition from the state of the vehicle at the given time to a state of the vehicle at a later time. For each of a succession of times after the given time, a subsequent finite set of candidate trajectories of the vehicle is generated that began at a location of the vehicle as of the succeeding time. The candidate trajectories of the subsequent finite set are based on a state of the vehicle and on possible behaviors of the vehicle and of the environment as of the location of the vehicle at the succeeding time.

One or more constraints are applied to the finite set of candidate trajectories. The applying of the one or more constraints includes attributing labels to each of the candidate trajectories of the finite set. Each of the labels includes a logical predicate that represents a property of the vehicle based on the candidate trajectory. None or in some cases at least one candidate trajectory is excluded from the finite set based on the one or more constraints. The excluding includes applying one of the constraints that include a hard constraint and that can be interpreted statically (i.e., in a manner that does not depend on time).

The candidate trajectories are represented as edges of a directed graph. The selecting of the putative optimal trajectory includes determining a minimum-cost path through a directed graph of which the candidate trajectories include edges.

The environment includes a vehicle. The generating of a finite set of candidate trajectories of the vehicle includes applying a model that represents the vehicle's expected response to a given control policy as of the location of the vehicle and the given time. The control policy includes a feedback function that determines commands to control the vehicle.

The costs are expressed as cost rules expressed in a formal language. The cost rules include prioritized and weighted rules. Each of the costs is expressed as an array of values each corresponding either to (a) a priority of a cost rule and an aggregate of violation costs of cost rules having that priority, or (b) a function of the candidate trajectory.

An actual trajectory of the vehicle is monitored for a given time period. For the given time period, the actual trajectory of the vehicle is compared with the putative optimal trajectory. The facilitating of an operation related to control of a vehicle includes monitoring a driver's performance. A result of the monitoring of the driver's performance is reported. The driver's performance is evaluated based on one or more performance metrics. The one or more of the performance metrics include safety metrics. The one or more of the performance metrics include comfort metrics. The one or more of the performance metrics include environmental metrics. The likelihood of an accident occurring is assessed. The likelihood of a violation of a rule of operation of the vehicle is assessed. The information related to the driver's performance is displayed on an in-vehicle display. The information related to the driver's performance is transmitted wirelessly to a receiver remote from the vehicle.

The facilitating of an operation related to control of a vehicle includes autonomously driving the vehicle. The rules of operation of the vehicle include rules of the road applicable to a driver of the vehicle.

In general, in an aspect, an operation related to control of a vehicle is facilitated by actions that include the following. A finite set of candidate trajectories of the vehicle is generated as of a given time. The finite set of candidate trajectories along to a trajectory space of all possible trajectories of the vehicle. Each of the candidate trajectories is assessed against constraints. A putative optimal trajectory is selected from among the candidate trajectories of the finite set based on costs associated with the candidate trajectories. The space of all possible trajectories of the vehicle is sufficiently covered by the generated finite set of candidate trajectories so that the putative optimal strategy is arbitrarily close to the optimal strategy. The selected putative optimal trajectory is used to facilitate the operation related to control of the vehicle.

Implementations may include one or any combination of two or more of the following features. The generating of the finite set of candidates includes applying a possibly non-deterministic process. The facilitating of the operation related to control of the vehicle includes applying a feedback control policy associated with the putative optimal trajectory to control elements of the vehicle. Each of the trajectories represents a temporal transition from the state of the vehicle at a given time to a state of the vehicle at a later time. For each of a succession of times after the given time, a subsequent finite set of candidate trajectories of the vehicle is generated that began at a location of the vehicle as of the succeeding time. The candidate trajectories of the subsequent finite set are based on a state of the vehicle and on possible behaviors of the vehicle and of the environment as of the location of the vehicle at the succeeding time.

One or more of the constraints are applied to the finite set of candidate trajectories. The applying of one or more constraints includes attributing labels to each of the candidate trajectories of the finite set. Each of the labels includes a logical predicate that represents a property of the vehicle based on the candidate trajectory. None or in some cases at least one candidate trajectory is excluded from the finite set based on the one or more constraints. The excluding of a candidate trajectory includes applying one of the constraints that includes a hard constraint and that can be interpreted statically.

The candidate trajectories are represented as edges of a directed graph. The selecting of the putative optimal trajectory includes determining a minimum-cost path through a directed graph of which the candidate trajectories include edges.

The environment includes a vehicle. The generating of a finite set of candidate trajectories of the vehicle includes applying a model that represents the vehicle's expected response to a given control policy as of the location of the vehicle and a given time. The control policy includes a feedback function that determines commands to control the vehicle.

The costs are expressed as cost rules expressed in a formal language. The cost rules include prioritized and weighted rules. Each of the costs is expressed as an array of values each corresponding either to (a) a priority of a cost rule and an aggregate of violation costs of cost rules having that priority, or (b) a function of the candidate trajectory.

An actual trajectory of the vehicle is monitored for a given time period. For the given time period, the actual trajectory of the vehicle is compared to the putative optimal trajectory. The facilitating of an operation related to control of a vehicle includes monitoring a driver's performance. A result of the monitoring of the driver's performance is reported. The driver's performance is evaluated based on one or more performance metrics. The one or more of the performance metrics include safety metrics. The one or more of the performance metrics include comfort metrics. The one or more of the performance metrics include environmental metrics. The likelihood of an accident occurring is assessed. The facilitating of an operation related to control of a vehicle includes monitoring a driver's performance. The facilitating an operation related to control of a vehicle includes autonomously driving the vehicle.

In general, in an aspect, an autonomous vehicle includes controllable devices configured to cause the vehicle to traverse at least part of an optimal trajectory in a manner consistent with control policies and with cost rules that apply to respective transitions between successive world states along the world trajectory. A controller provides commands to the controllable devices in accordance with the world trajectory. Sources provide information about world states at successive times. A computational element iteratively updates (a) a set of world states, each of the world states representing a combination of a state of the vehicle, a state of an environment of the vehicle, and a state of at least one other object in the environment based at least in part on the information about world states, and (b) a set of world trajectories, each of the world trajectories representing a temporal transition between one of the world states and another of the world states. Each of the iterations of the updating includes, for each of one or more of the world states and for a corresponding vehicle control policy, simulating a candidate trajectory from the world state to a subsequent world state. If the simulated candidate trajectory does not violate a constraint, the trajectory is added to the set of world trajectories to form an updated set of world trajectories. If necessary, a new world state is added to the set of world states corresponding to the transition represented by the simulated candidate trajectory to form an updated set of world states. A minimum-cost path is determined through the updated set of world states and the updated set of world trajectories. The determining includes applying cost rules to respective transitions of world trajectories. Information representing a next transition from the current world state to a next world state along the minimum-cost path is delivered to the controller, for autonomous control of the vehicle.

These and other aspects, features, and implementations can be expressed as methods, apparatus, systems, components, program products, methods of doing business, means or steps for performing a function, and in other ways.

These and other aspects, features, and implementations will become apparent from the following description, including the claims.

DESCRIPTION

Here we describe a system and techniques that can be used to monitor the performance of a human driver, to facilitate the operation of a self-driving vehicle, and to perform other useful functions.

Figure 1:
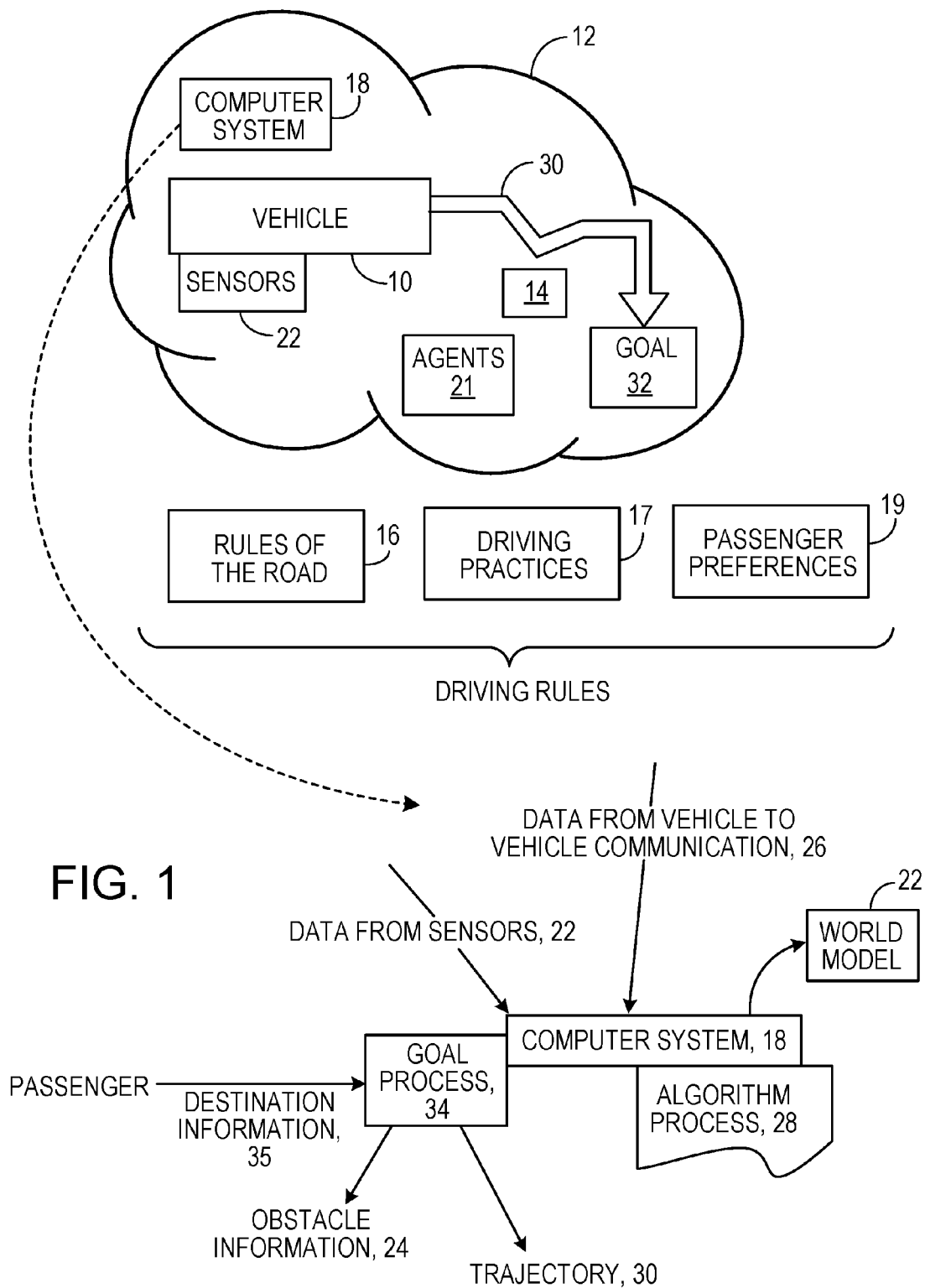
FIG. 1 is a block diagram of a system for generating control actions for an autonomous vehicle.

As shown in FIG. 1, in implementations that involve facilitating the operation of a self-driving road vehicle 10, for example, the self-driving road vehicle can be driven without direct human control or supervisory input through an environment 12, while avoiding collisions with obstacles 14 (such as other vehicles, pedestrians, cyclists, and environmental elements) and obeying the rules of operation (in this case, rules of the road, for example) 16. To accomplish such automated driving, the self-driving road vehicle (or more specifically, the computer system or data processing equipment 18 associated with, for example attached to, the vehicle) first generally constructs a world model 20.

Roughly speaking, a world model is a representation of the environment of the vehicle, e.g., constructed using data from a geolocation device, a map, or geographic information system or combinations of them, and sensors that detect other vehicles, cyclists, pedestrians, or other obstacles. To construct the world model, the computer system, e.g., aboard the vehicle collects data from a variety of sensors 22 (e.g., LIDAR, monocular or stereoscopic cameras, RADAR) that are mounted to the vehicle (which we sometimes referred to as the "ego vehicle"), then analyzes this data to determine the positions and motion properties (which we sometimes refer to as obstacle information 24) of relevant objects (obstacles) in the environment. We use the term relevant objects broadly to include, for example, other vehicles, cyclists, pedestrians, and animals, as well as poles, curbs, traffic cones, and barriers. (There may also be objects in the environment that are not relevant, such as small roadside debris and vegetation.) Self-driving vehicles may also rely on obstacle information gathered by vehicle-to-vehicle communication 26.

Given the world model, the computer system aboard the self-driving vehicle employs an algorithmic process 28 to automatically generate and execute a trajectory 30 through the environment toward a designated goal 32. We use the term trajectory broadly to include, for example, a path or route from one place to another, e.g., from a pickup location to a drop off location. In some implementations, a trajectory can comprise a sequence of transitions each from one world state to a subsequent world state.

The designated goal is generally provided by another algorithmic process 34 that relies, for example, on passenger-provided information 35 about a passenger's destination. We use the word goal broadly to include, for example, the objective to be reached by the self-driving vehicle, such as, an interim drop off location, a final drop off location, or a destination, among others. We use the term passenger broadly to include, for example, one or more human beings who are carried by the self-driving vehicle, or a party who determines a destination for an object to be carried by a self-driving vehicle, among other things.

The automatically generated trajectory should ideally possess at least the following properties:

1) It should be feasible, meaning that the trajectory can be followed by the vehicle with a reasonable degree of precision at the vehicle's current or expected operating speed;

2) It should be collision free, meaning that, were the vehicle to travel along the trajectory, it would not collide with any objects; and 3) It should obey a predefined set of rules, which may include local rules of operation or rules of the road, common driving practices 17, or the driving preferences 19 of a general class of passenger or a particular passenger or a combination of any two or more of those factors. Together these and possibly other similar factors are sometimes referred to generally as rules of operation (and we sometimes refer to rules of operation as driving rules). When no trajectory exists that obeys all predefined driving rules, the trajectory should minimize the severity and extent of rule violation.

Automated trajectory generation should satisfy the three properties described above, in a context in which the environment (e.g., the road) is shared with other independent agents 21, including vehicles, pedestrians, and cyclists, who move independently under their own wills.

Automatic trajectory generation also should systematically ensure that the driving rules will be correctly enforced for the ego vehicle in complex scenarios involving several relevant driving rules or the presence of numerous obstacles, or scenarios in which there does not exist a trajectory that would comply with all of the driving rules, or combinations of two or more of such conditions.

Here we describe systems and techniques for generating control actions based on real-time sensor data and historical information that enable a self-driving road vehicle to proceed safely and reliably to a destination on, for example, a road network shared with other vehicles and pedestrians, while complying with the applicable driving rules.

Figure 2:
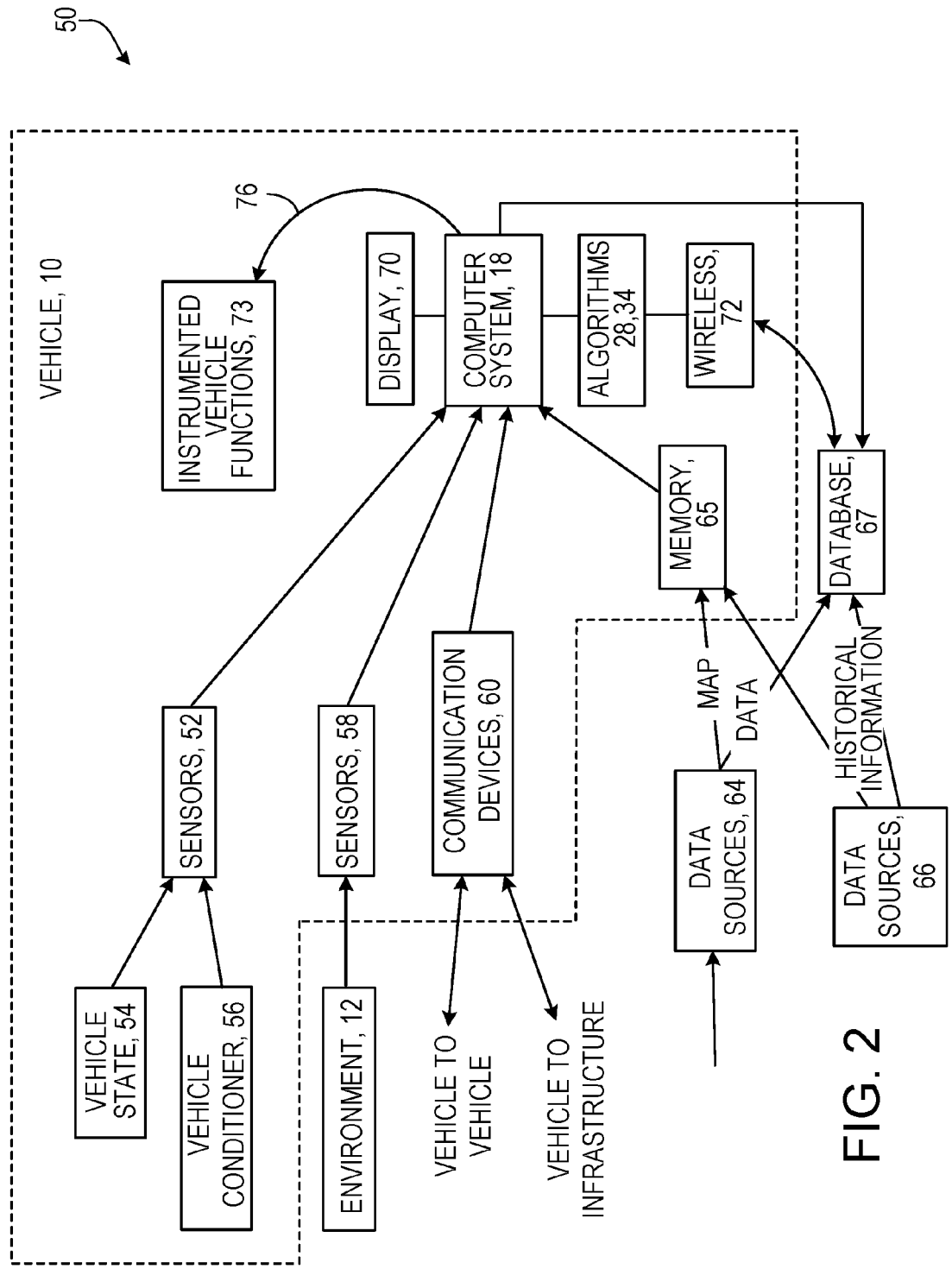
FIG. 2 is a block diagram of a vehicle.

As shown in FIG. 2, the system 50 includes the following basic elements:

1. Sensors 52 able to measure or infer or both properties of the ego vehicle's state 54 and conditions 56, such as the vehicle's position, linear and angular velocity and acceleration, and heading. Such sensors include but are not limited to, e.g., GPS, inertial measurement units that measure both vehicle linear accelerations and angular rates, individual wheel speed sensors and derived estimates of individual wheel slip ratios, individual wheel brake pressure or braking torque sensors, engine torque or individual wheel torque sensors, and steering wheel angle and angular rate sensors, and combinations of them.

2. Sensors 58 able to measure properties of the vehicle's environment 12. Such sensors include but are not limited to, e.g., LIDAR, RADAR, monocular or stereo video cameras in the visible light, infrared, or thermal spectra, ultrasonic sensors, time-of-flight (TOF) depth sensors, as well as temperature and rain sensors, and combinations of them. Data from such sensors can be processed to yield information about the type, position, velocity, and estimated future motion of other vehicles, pedestrians, cyclists, scooters, carriages, carts, and other moving objects. Data from such sensors can also be used to identify and interpret relevant objects and features such as static obstacles (e.g., poles, signs, curbs, traffic marking cones and barrels, road dividers, trees), road markings, and road signs. Sensors of this type are commonly available on vehicles that have a driver assistance capability or a highly automated driving capability (e.g., a self-driving vehicle).

3. Devices 60 able to communicate the measured or inferred or both properties of other vehicles' states and conditions, such as other vehicles' positions, linear and angular velocities and accelerations, and headings. These devices include Vehicle-to-Vehicle (V2) and Vehicle-to-Infrastructure (V2I) communication devices and devices for wireless communications over point-to-point or ad-hoc networks or both. The devices can operate across the electromagnetic spectrum (including radio and optical communications) or other media (e.g., acoustic communications).

4. Data sources 62 providing historical, real-time, or predictive (or any two or more of them) data about the environment, including traffic congestion updates and weather conditions. Such data may be stored on a memory storage unit 60 on the vehicle or transmitted to the vehicle by wireless communication from a remotely located database 62.

5. Data sources 64 providing road maps drawn from GIS databases, potentially including high-precision maps of the roadway geometric properties, maps describing road network connectivity properties, maps describing roadway physical properties (such as the number of vehicular and cyclist travel lanes, lane width, lane traffic direction, lane marker type, and location), and maps describing the spatial locations of road features such as crosswalks, traffic signs of various types (e.g., stop, yield), and traffic signals of various types (e.g., red-yellow-green indicators, flashing yellow or red indicators, right or left turn arrows). Such data may be stored on a memory storage 65 unit on the vehicle or transmitted to the vehicle by wireless communication from a remotely located database 67.

6. Data sources 66 providing historical information about driving properties (e.g. typical speed and acceleration profiles) of vehicles that have previously traveled along a given road section at a similar time of day. Such data may be stored on a memory storage unit on the vehicle or transmitted to the vehicle through wireless communication from a remotely located database.

7. A computer system 18 (data processor) located on the vehicle that is capable of executing algorithms 69. e.g., as described in this application. The algorithms, among other things, process data provided by the above sources and (in addition to other results discussed below), compute a predicted optimal trajectory 61 that encompasses a safe driving action in a current scenario that can be taken over a short future time horizon (the time horizon can be, for example, on the order of, for example, 2-5 seconds although in some cases the time horizon can be shorter (for example, fractions of seconds) or longer (for example tens of seconds, minutes, or many minutes). (As discussed below, the algorithms also can (for example, at some future time) compare the vehicle's actual travel trajectory actions to this optimal trajectory, or to a database of comparable stored trajectories of human drivers, as a means of assessing driver performance.)

8. A display device 70 aboard the vehicle that is connected to the computer system, to provide a wide variety of information to a passenger (or in the case discussed later of a human-driven vehicle, to a driver) regarding, for example, the operation, state, or condition of the vehicle, the trajectory of the vehicle, maps, information derived from one or more of the sensors, information about obstacles, alerts of various types, and other information, and combinations of any two or more of them. (In the case of a human driven vehicle, the alerts can include, for example, alerts related to good driving performance, bad driving performance, or both of them. In addition reports can be provided to the driver and to authorized and authenticated users about the driver's behavior and the quality of her driving performance as needed or useful.)

9. A wireless communication device 72 to transmit data from a remotely located database to the vehicle and to transmit data to a remotely located database. The transmitted data could carry a wide variety of information including, for example, the operation, state, or condition of the vehicle, the trajectory of the vehicle, the optimal trajectory, information related to maps, information derived from one or more of the sensors, information about obstacles, alerts of various types, and other information, and combinations of any two or more of them. The wireless communication device may also be used to transmit driving data or descriptions of the driver's performance directly or indirectly to a trusted recipient (e.g., by email or text message).

10. A vehicle 10 having features and functions (e.g., actuators) that are instrumented to receive and act upon commands 76 corresponding to control actions (e.g., steering, acceleration, deceleration, gear selection) and for auxiliary functions (e.g., turn indicator activation) from the computer system. We use the term commands broadly to include, for example, any instruction, direction, mandate, request, or call, or combination of them, that is delivered to the operational features and functions of the vehicle. We use the term control actions broadly to include, for example, any action, activation, or actuation that is necessary, useful, or associated with causing the vehicle to proceed along at least a part of a trajectory or to perform some other operation.

11. A memory 65 to which the computer system has access on the vehicle to store, for example, the data and information mentioned above.

Figure 7:
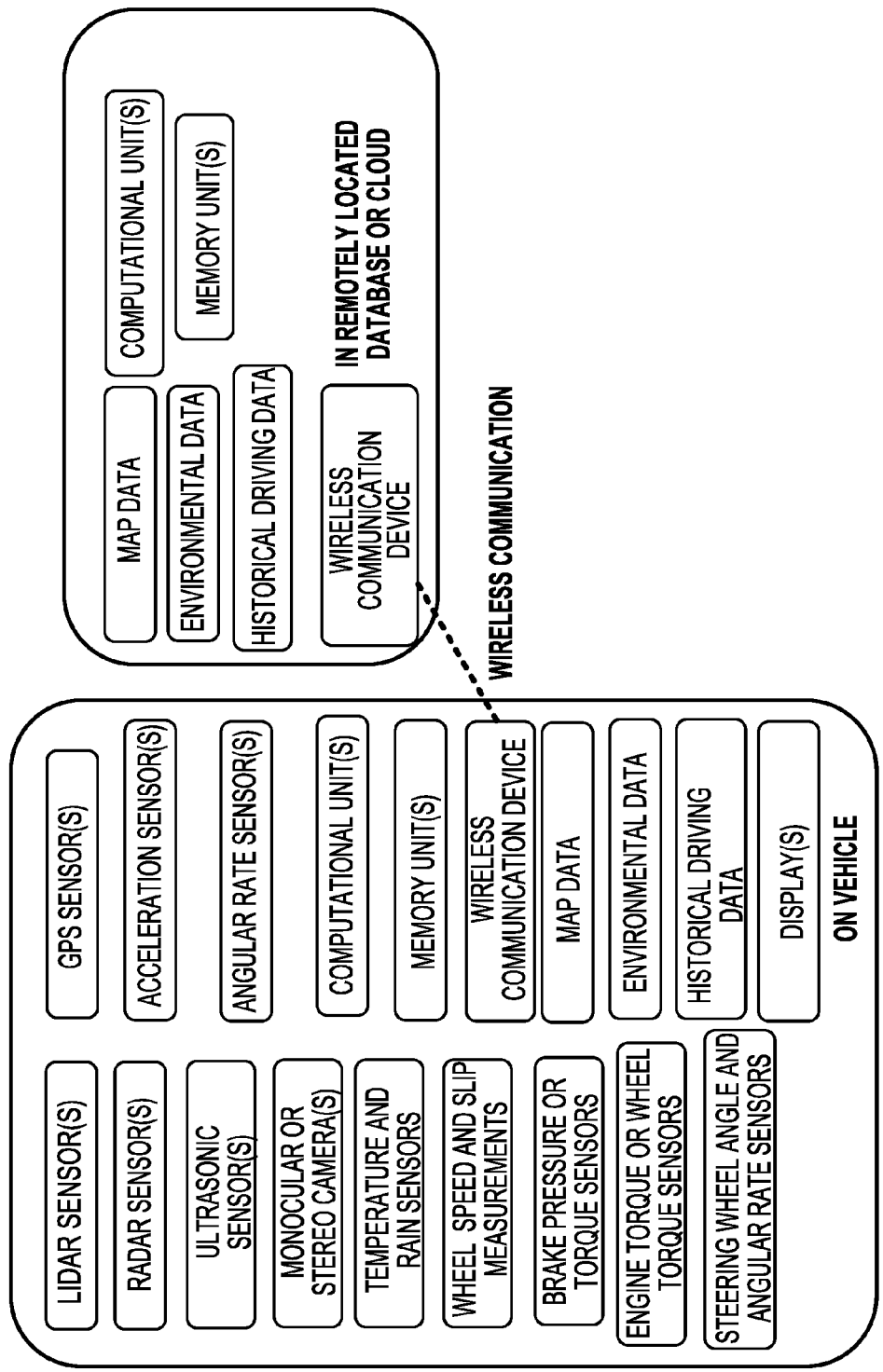
FIG. 7 is a schematic diagram.
Figure 8:
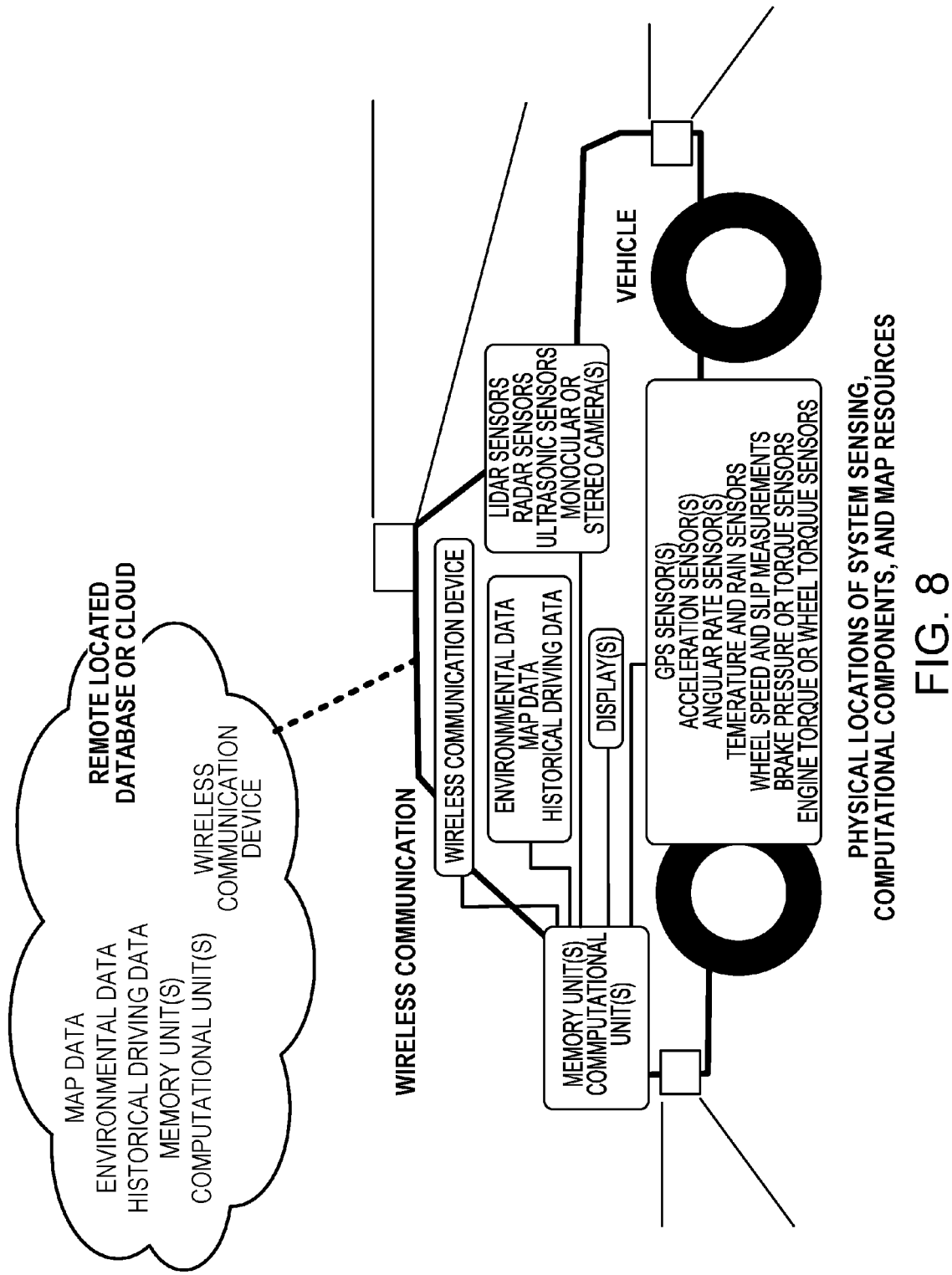
FIG. 8 is a schematic diagram of a vehicle.

FIGS. 7 and 8 illustrate some of the sensing, computational components, and map resources and their logical and physical locations in the system.

Figure 3:
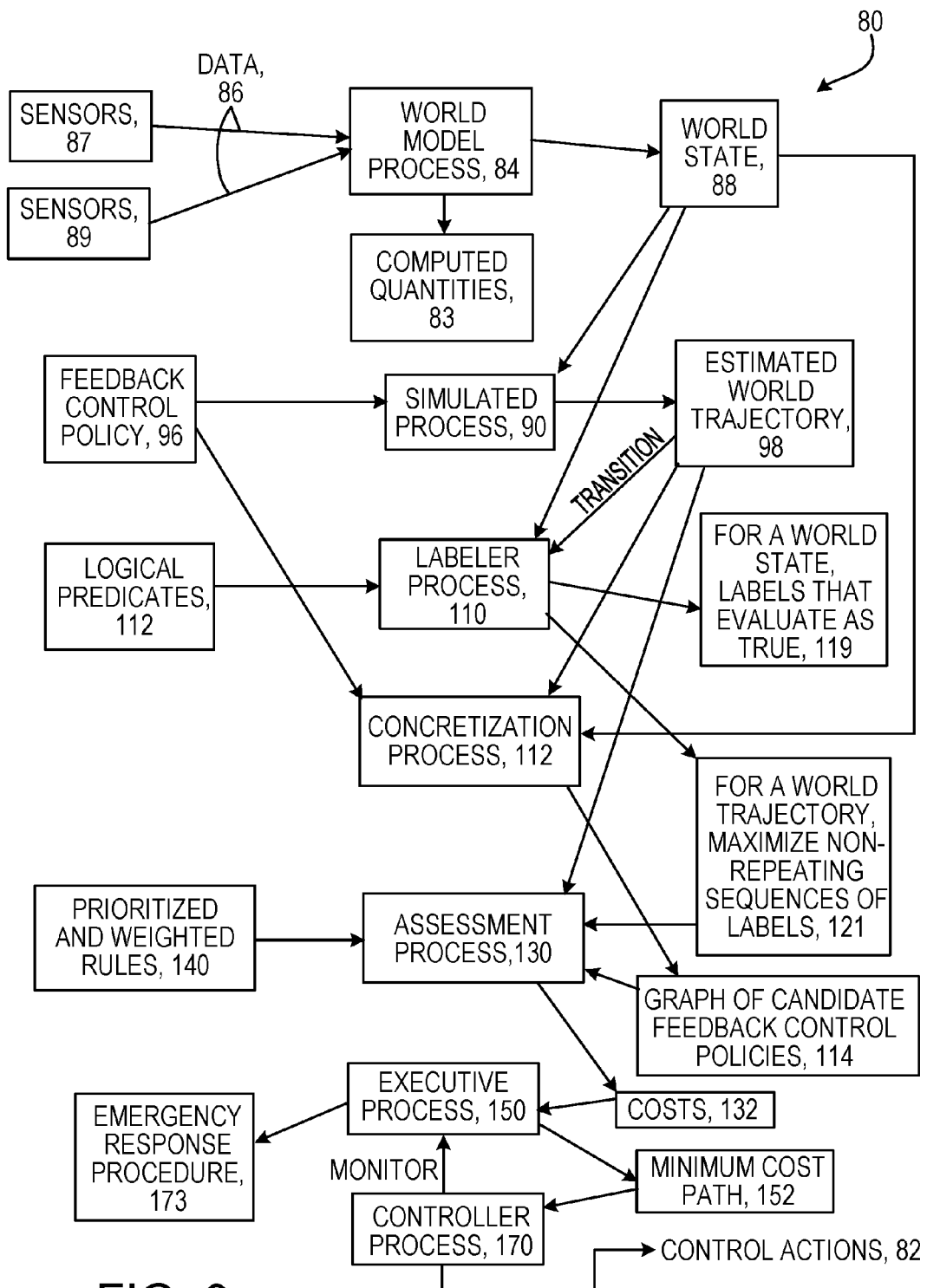
FIG. 3 is a flow diagram of processes to generate control actions.
Figure 9:
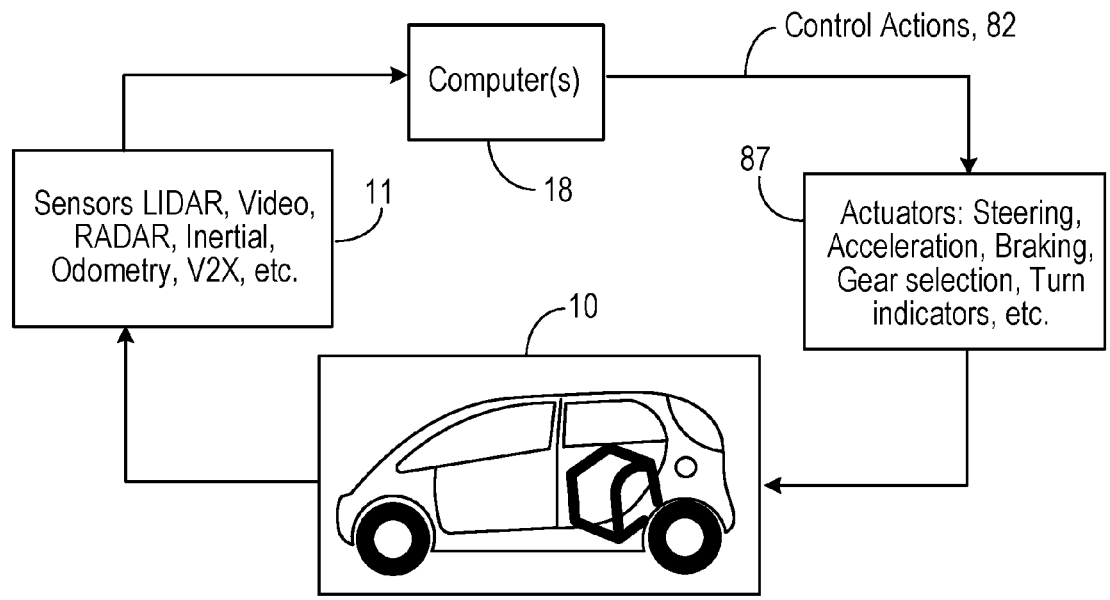
FIG. 9 is a block diagram.

As shown in FIG. 3 (and referring also to FIG. 9), we now describe a method 80 for on-line generating at execution time a set or sequence of control actions 82 used by actuators 87 (e.g., the features and functions of the vehicle that can respond to control actions) and based on both real-time sensor data 11 and regulatory data. In some implementations the method comprises at least the following key processes that are run on the computer system 18 in the vehicle 12:

A. A world model process 84, which analyzes data 86 collected, for example, by the on-board vehicle sensors 87 and data sources 89, and data received through vehicle-to-vehicle or vehicle-to-infrastructure communication devices, to generate an estimate (and relevant statistics associated with the estimate) of quantities that characterize the ego vehicle and its environment. Roughly speaking the world model can estimate the state of the ego vehicle and the environment based on the incoming data. The estimate produced by the world model as of a given time is called a world state 88 as of that time.

Quantities expressed as part of the world state include, but are not limited to, statistics on: the current position, velocity, and acceleration of the ego vehicle; estimates of the types, positions, velocities, and current intents of other nearby vehicles, pedestrians, cyclists, scooters, carriages, carts, and other moving objects or obstacles; the positions and types of nearby static obstacles (e.g., poles, signs, curbs, traffic marking cones and barrels, road dividers, trees); and the positions, types and information content of road markings, road signs, and traffic signals. The world state can also include information about the roadway's physical properties, such as the number of vehicular and cyclist travel lanes, lane width, lane traffic direction, lane marker type and location, and the spatial locations of road features such as crosswalks, traffic signs, and traffic signals. The world state 88 contains probabilistic estimates of the states of the ego vehicle and of nearby vehicles, including maximum likelihood estimate, error covariance, and sufficient statistics for the variables of interest.

Figure 4:
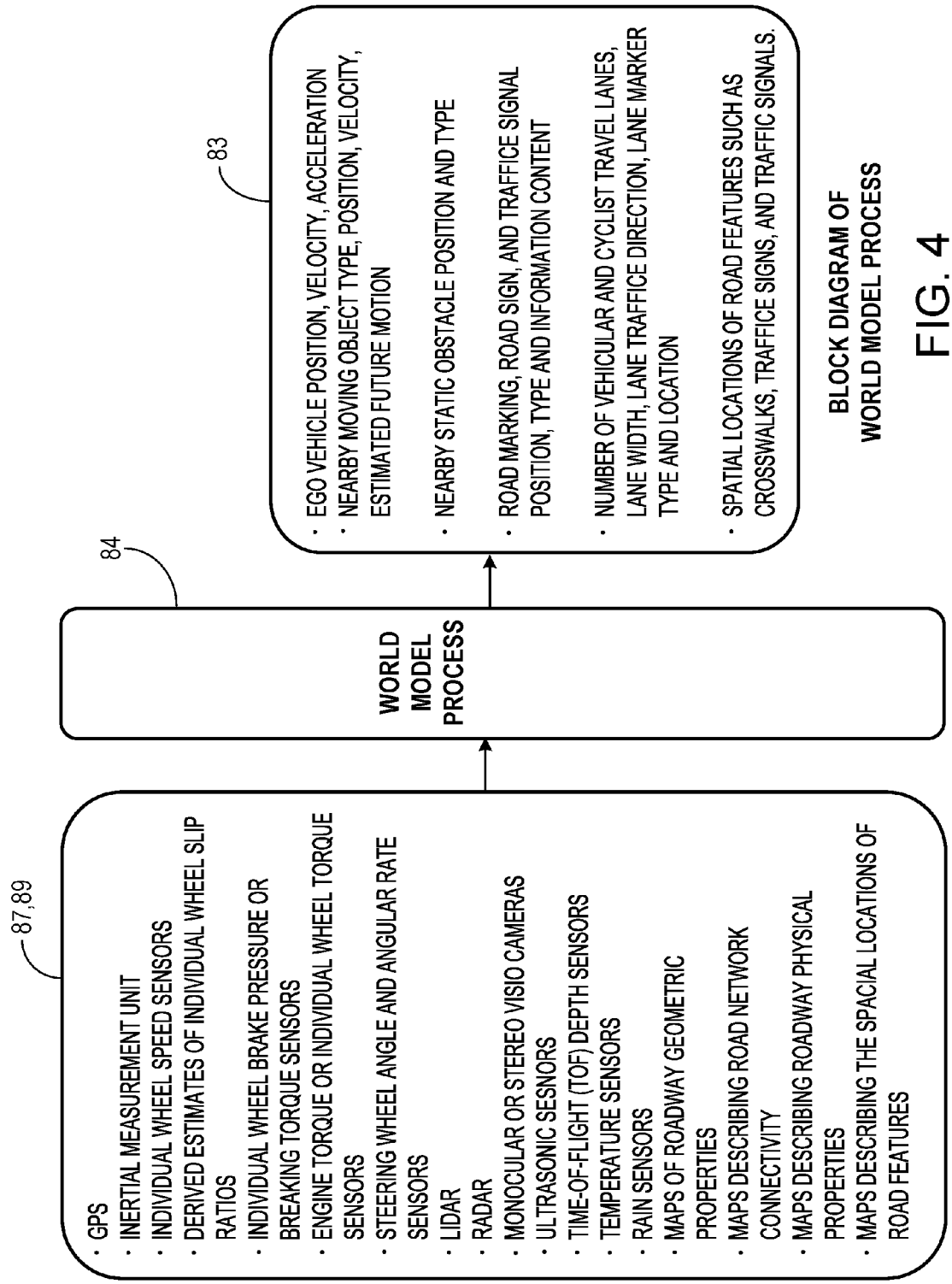
FIG. 4 is a schematic diagram of a world model process.

As shown also in FIG. 4, when the world model process 84 is executed with respect to a given time, data is captured from all available vehicle sensors and data sources and processed to compute some or all of the following quantities 83 as of that time:

1. The position and heading of the ego vehicle in a global coordinate frame. These quantities can be directly measured using a GPS system or computed by known techniques (e.g., such as those described in [Optimal Filtering, Brian D. O. Anderson, John B. Moore, Dover, 2005] that combine information from GPS, IMU (inertial measurement unit), wheel speed sensors, and potentially other sensors such as LIDAR sensors.

2. The linear and angular velocity and acceleration of the ego vehicle. These quantities can be directly measured using an IMU system.

3. The steering angle of the ego vehicle. This quantity can be directly measured by standard automotive sensors.

4. The positions of stop signs, yield signs, speed limit signs, and other traffic signs relevant to the ego vehicle's current direction of travel. These quantities can be measured using commercially available devices or by known techniques such as those described in [De La Escalera, Arturo, Luis E. Moreno, Miguel Angel Salichs, and Jośe Maria Armingol. "Road traffic sign detection and classification." IEEE Transactions on Industrial Electronics, 44, no. 6 (1997): 848-859., Bahlmann, Claw, Ying Zhu, Visvanathan Ramesh, Martin Pellkofer, and Thorstea Koehler. "A system for traffic sign detection, tracking, and recognition using color, shape, and motion information." In Proceedings of the IEEE Intelligent Vehicles Symposium, (2005): pp. 255-260. Maldonado-Bascón, Saturnino, Sergio Lafuente-Arroyo, Pedro Gil-Jimenez, Hilario Gómez-Moreno, and Francisco López-Ferreras. "Road-sign detection and recognition based on support vector machines." IEEE Transactions on Intelligent Transportation Systems, 8, no. 2 (2007): 264-278., Møgelmose, Andreas, Mohan Manubhai Trivedi, and Thomas B. Moeslund. "Vision-based traffic sign detection and analysis for intelligent driver assistance systems: Perspectives and survey." IEEE Transactions on Intelligent Transportation Systems, 13, no. 4 (2012): 1484-1497., Franke, Uwe, Dariu Gavrila, Steffen Görzig, Frank Lindner, Frank Paetzold, and Christian Wöhler. "Autonomous driving goes downtown." IEEE Intelligent Systems and their Applications. 6 (1998): 40-48.]). The quantities can also be gathered from commercially available map data that includes such information (e.g., from specialty map providers such as TomTom®), or from commercially available maps that have been manually annotated to include such information. If such information is gathered from map data, it may be stored on the memory storage unit 65 on the vehicle or transmitted to the vehicle by wireless communication from a remotely located database, as mentioned earlier.

5. The boundaries of the drivable road surface, markings demarcating individual travel lanes (including both the positions and types of such markings), and the identified edges of an unpaved track. These quantities can be measured using commercially available sensors or by known techniques such as those described in [He, Yinghua, Hong Wang, and Bo Zhang. "Color-based road detection in urban traffic scenes." IEEE Transactions on Intelligent Transportation Systems, 5.4 (2004): 309-318., Wang, Yue, Eam Khwang Teoh, and Dinggang Shen. "Lane detection and tracking using B-Snake." Image and Vision Computing 22.4 (2004): 269-280., Kim, ZuWhan. "Robust lane detection and tracking in challenging scenarios." IEEE Transactions on Intelligent Transportation Systems, 9, no. 1 (2008): 16-26.]). These quantities can also be gathered from commercially available map data as described in item 4.

6. The state (e.g., red/yellow/green/arrow) of traffic signals relevant to the ego vehicle's current direction of travel. These quantities can be measured by commercially available devices or known techniques such as those described in [Lindner, Frank, Ulrich Kressel, and Stephan Kaelberer. "Robust recognition of traffic signals." In Proceedings of the IEEE Intelligent Vehicles Symposium, 2004., Fairfield, Nathaniel, and Chris Urmson. "Traffic light mapping and detection." In Proceedings of the International Conference on Robotics and Automation (ICRA), 2011., Shen, Yehu, Umit Ozguner, Keith Redmill, and Jilin Liu. "A robust video based traffic light detection algorithm for intelligent vehicles." In Proceedings of the IEEE Intelligent Vehicles Symposium, 2009, pp. 521-526.]).

7. The positions of pedestrian crosswalks, stop lines, and other road features. These quantities can be gathered from commercially available map data as described in item 4.

8. The positions and velocities of other vehicles, pedestrians, cyclists, scooters, carriages, carts, and other moving objects relevant to the ego vehicle's current lane of travel. These quantities can be measured using commercially available devices (e.g., [Mobileye 560. http://www.mobileye.com/products/,Autoliv Stereo-vision camera. https://www.autoliv.com/ProductsAndInnovations/ActiveSafetySystems/Pages/VisionSystems.aspx, Delphi Electronically Scanning Radar http://delphi.com/manufacturers/auto/safety/active/electronically-scanning-radar, Ibeo LUX http://www.autonomoustuff.com/ibeo-lux-standard.html]), or known techniques such as those described in [Premebida, Cristiano, Goncalo Monteiro, Urbano Nunes, and Paulo Peixoto. "A lidar and vision-based approach for pedestrian and vehicle detection and tracking." In Proceedings of the IEEE Intelligent Transportation Systems Conference, 2007, pp. 1044-1049., Wang, Chieh-Chih, Charles Thorpe, Sebastian Thrun, Martial Hebert, and Hugh Durrant-Whyte. "Simultaneous localization, mapping and moving object tracking." The International Journal of Robotics Research 26, no. 9 (2007): 889-916., Premebida, Cristiano, Oswaldo Ludwig, and Urbano Nunes. "LIDAR and vision-based pedestrian detection system." Journal of Field Robotics 26, no. 9 (2009): 696-711., Yilmaz, Alper, Omar Javed, and Mubarak Shah. "Object tracking: A survey." ACM Computing Surveys 38.4 (2006): 13., Gavrila, Dariu M., and Vasanth Philomin. "Real-time object detection for "smart" vehicles." In Proceedings of the Seventh IEEE International Conference on Computer Vision, vol. 1, pp. 87-93, 1999.]).

9. The positions of static obstacles (e.g., poles, signs, curbs, traffic marking cones and barrels, road dividers, trees) on the drivable road surface. These quantities can be measured using commercially available devices (e.g., [Mobileye 560. http://www.mobileye.com/products/, Autoliv Stereo-vision camera. https://www.autoliv.com/ProductsAndInnovations/ActiveSafetySystems/Pages/VisionSystems.aspx, Delphi Electronically Scanning Radar http://delphi.com/manufacturers/auto/safety/active/electronically-scanning-radar, Ibeo LUX http://www.autonomoustuff.com/ibeo-lux-standard.html]) or known techniques such as those described in [Premebida, Cristiano, Goncalo Monteiro, Urbano Nunes, and Paulo Peixoto. "A lidar and vision-based approach for pedestrian and vehicle detection and tracking." In Proceedings of the IEEE Intelligent Transportation Systems Conference, 2007, pp. 1044-1049., Wang, Chieh-Chih, Charles Thorpe, Sebastian Thrun, Martial Hebert, and Hugh Durrant-Whyte. "Simultaneous localization, mapping and moving object tracking." The International Journal of Robotics Research 26, no. 9 (2007): 889-916., Premebida, Cristiano, Oswaldo Ludwig, and Urbano Nunes. "LIDAR and vision-based pedestrian detection system." Journal of Field Robotics 26, no. 9 (2009): 696-711., Yilmaz, Alper, Omar Javed, and Mubarak Shah. "Object tracking: A survey." ACM Computing Surveys 38.4 (2006): 13., Gavrila, Dariu M., and Vasanth Philomin. "Real-time object detection for "smart" vehicles." In Proceedings of the Seventh IEEE International Conference on Computer Vision, vol. 1, pp. 87-93, 1999., Golovinskiy, Aleksey, Vladimir G. Kim, and Thomas Funkhouser. "Shape-based recognition of 3D point clouds in urban environments." In Proceedings of the 12th International Conference on Computer Vision, pp. 2154-2161, 2009.]).

10. The current atmospheric conditions, for example, whether it is snowing or raining, and whether it is cold enough for ice to be present on the road surface. These quantities can be directly measured or inferred using standard automotive rain and temperature sensors.

11. Historical information about driving properties (e.g. typical speed and acceleration profiles) of vehicles that have previously traveled along the road section at a similar time of day. Such data may be stored on the memory storage unit on the vehicle or transmitted to the vehicle using wireless communication from the remotely located database.

The system described here can usefully function in the absence of a complete set of the quantities listed above. All computed quantities described in 1 through 11 above can be stored in the memory unit on the vehicle.

Figure 5:
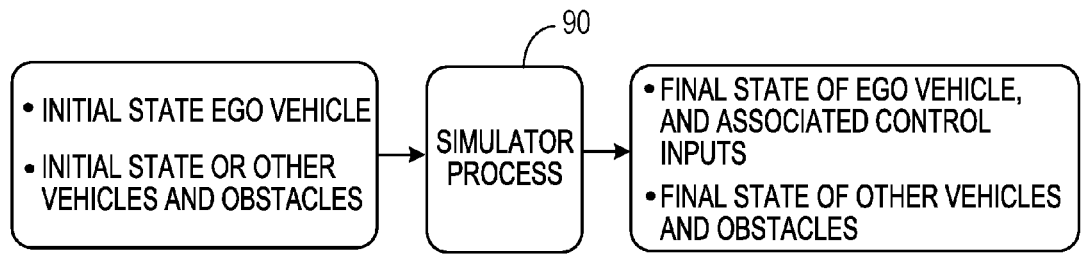
FIG. 5 is a block diagram of a simulator process.

B. A simulator process 90 (shown also in FIG. 5), which takes as an input a world state 88 (e.g., a data structure of the form of the output of the world model) and employs known numerical or analytical simulation models of the ego vehicle's response to a given chosen feedback control policy 96 (e.g., a function computing steering, brake, and throttle commands based on information about the environment), in order to estimate or predict a trajectory 98 (i.e., a sequence of states indexed by time) that the physical ego vehicle will follow if it begins at the given time in the world state received from the world model and is subjected to the given chosen feedback control policy. In other words, the simulator process simulates a world trajectory of the ego vehicle given the world state, using an existing model of how the ego vehicle will respond to the given chosen feedback control policy that determines steering, braking, and throttling commands.

For a given vehicle, there can be a large number and wide range of feedback control policies, each of which can govern commands sent to the functional devices of the ego vehicle based on the time and the state of the environment. Different feedback control policies can produce different behaviors of a vehicle that begins at a given world state, and the vehicle will respond differently to different feedback control policies. We use the term "control policy" broadly to include, for example, any control law that is computed based on the sensor information; for example, if the car is on the left of the desired path, the control policy could be arranged to cause the car to move to the right; or if the car is approaching another vehicle, the control policy will cause the car to slow down (as would be done in an adaptive cruise control system.) Any of a broad range of feedback formulas and combinations of them could be used, such as Jacobian, feedback linearization, back-stepping, sliding mode, and model predictive control. The simulator process also contains models of other objects such as other vehicles, cyclists, and pedestrians and can predict their trajectories in a similar way.

The information contained in the world state enables the simulator process to richly assess the anticipated motion of the ego vehicle and other objects through the environment (that is, for example, to predict the motion of the car as a part of an ensemble of independent agents (rather than a vehicle in a vacuum)). The output 102 of the simulator process is an estimated world trajectory 98, i.e., a sequence of world states indexed by time that each will result in a transition to a successor world state.

The simulator process can be operated as a service process that responds to requests from other processes that include or point to a given world state and ask for a prediction of the world trajectory of the ego vehicle or some other object based on the given world state.

C. A labeler process 110, which selects, from a given set of logical predicates 112, those 114 that apply to a specific world state (as generated by the world model) or a specific transition of a predicted world trajectory of the vehicle (as generated by the simulator). We use the term logical predicate to include, for example, an expression that can be evaluated to produce a logical result when actual values are substituted for unknown quantities that are part of the expression. Examples of predicates include "the ego vehicle is in the right lane," "the ego vehicle is in collision", "the ego vehicle's is behind vehicle X", "the ego vehicle's speed exceeds the posted limits", and "the ego vehicle is stopped". More specifically, for example, if the vehicle's position and heading is (x,y,theta)=(13.5, −1.39, 0.34), then the vehicle is in the right lane.

The labeler process also can generate a sequence of labels 116, or symbols, that apply to a given (space-time) trajectory, e.g., a sequence of states indexed by time. Such sequence of labels is the maximal (e.g., the longest for finite sequences) ordered list of non-repeating labels associated to a sub-sequence of states along the given trajectory, and corresponds to a logical trajectory 118 describing the physical behavior of the vehicle in the context of the activities of the vehicle (e.g., "the ego vehicle transitions from the left lane to the right lane after overtaking vehicle X, and then stops at the intersection"). By logical trajectory we mean, for example, a trajectory expressed as logical-type statements that describe the operation or behavior of, for example, the ego vehicle.

The labeler process can act as a server process that takes as input either a world state or a transition that is part of the world trajectory, as generated by the simulator process, and a list of potential labels (relevant to transitions) or logical predicates (relevant to states) that encode properties of interest of the ego vehicle with respect to other vehicles and the environment. The labeler process associates to each input world state the set of predicates?? 119 that evaluate as true at that particular world state. The labeler process associates to each input world trajectory the maximal non-repeating sequence of labels associated to arbitrary sub-sequences of world states chosen along the world trajectory. The labels and predicates can be assigned using known analytical and numerical methods.

Figure 6:
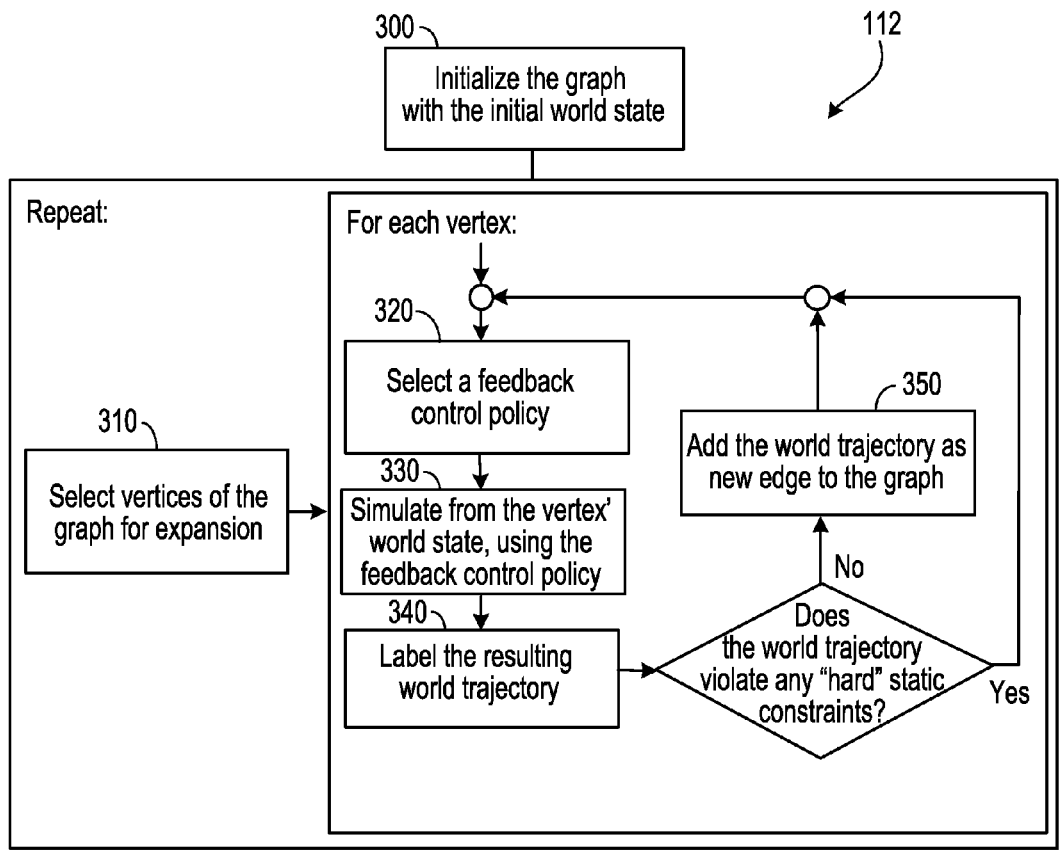
FIG. 6 is a block diagram of a concretization process.

D. Referring also to FIG. 6, a concretization process 112, which incrementally constructs a directed graph 114 of candidate feedback control policies that would result in a respective finite set of behaviors for the ego vehicle and for nearby vehicles and the environment. Each edge in the graph corresponds to a segment of a finite-time-span world trajectory and is defined by a particular feedback control policy that would be executed to generate the edge of the trajectory. Each vertex or node in the graph corresponds to a world state and represents a decision point at which a new feedback control policy is to be selected. Thus, each of the world trajectories comprises a sequence of world states at successive times and expresses transitions between successive world states along the trajectory that correspond to a succession of behaviors corresponding to a particular succession of feedback control policies.

At run time (when the ego vehicle is being driven), or in simulation (when the trajectory of the vehicle is being predicted), a feedback control policy 96 results in a specific instance of an edge of a space-time trajectory, depending on the measurements obtained by on-board sensors and on the observed] prior actual trajectory of the vehicle and the environment.

The root of the directed graph is a world state 88 initialized 300 as an output of the world model process 84. At each iteration (that is, at each successive time step), the concretization process receives an estimate of the current world state and updates the directed graph. It does this by first selecting 310 one or more of the vertices of the current directed graph and selecting 320 a feedback control policy for each of these vertices that will correspond to a transition from that vertex to a next vertex at the next time step.

The concretization process then invokes the simulation process 330 for each of the pairs (world state, feedback control policy) that the concretization process has selected. Then, a transition of the predicted trajectory that is the output of the simulation process for each of the pairs is fed to the labeler process 340, which produces the label sequence for the transition. If the (labeled) transitions thus obtained do not violate 342 any hard constraints that can be interpreted statically (e.g., collision with a fixed object), they are added 350 to the directed graph as new edges, starting from the vertices corresponding to the initial world states. If the endpoints of any of the transitions do not match the world states of vertices that already are in the directed graph, these states are added as new vertices to the directed graph. Otherwise, each edge is connected to the vertex of the matching world state.

There are several known ways to choose the vertices and feedback control policies for graph expansions of the directed graph (e.g., PRM*, RRT, RRT*). These are algorithms that are known to be (1) probabilistically complete (i.e., they can find a valid solution, if one exists, with high probability), (2) asymptotically optimal (i.e., they will eventually produce solutions that approximate arbitrarily well an optimal solution, as implied by (1)), and (3) computationally efficient, (i.e., they require O(log n) operations to add a vertex to a graph with n vertices.) Other algorithms that have these characteristics could also be used.

In some implementations, the concretization process has the following properties: Completeness and asymptotic optimality: Let x indicate the world state, let u indicate control actions (steering, throttling, breaking, etc.), and let T indicate a finite time interval. For any additive cost function of the form $J=\int_T y(x(t),u(t))dt$, where $y(x,u) \geq 0$, and such that $\int_S y(x(t(s)),u(t(s)))ds>0$ on any closed curve S, let J[n] be the cost of the minimum-cost path on the directed graph after n iterations. Then the concretization method is asymptotically optimal (and hence complete) if the limit of J[n] as n goes to infinity is the same as the global infimum of J over all feasible trajectories for x and u, satisfying the same boundary conditions. (Roughly speaking, the concretization method meets this criterion if an underlying random geometric graph percolates and is connected; additional information is provided in S. Karaman and E. Frazzoli. Sampling-based algorithms for optimal motion planning. Int. Journal of Robotics Research, 30(7):846-894, June 2011.

Efficiency: In order to preserve computational efficiency, the cost of executing each iteration of the concretization process, in the presence of n vertices in the tree, should not be more than O(log n).

One aspect of generating control actions for autonomous vehicles is to plan a trajectory that satisfies many constraints and minimizes certain costs. In some known systems, this is done by formulating a large optimization problem and then attempting to converge on a good trajectory starting from an initial guess, based on the cost and on the constraints. Because this amounts to attempting to search in an infinite-dimensional space (the space of trajectories) subject to potentially thousands of constraints, known systems have strategies for simplifying the system or the set of constraints or for imposing additional constraints that simplify the search.

In the approach that we are describing here, the concretization process quickly generates many candidate trajectories, say, several hundred per second. 200 per second could be a typical value, but the rate could be more or less than 200. The faster the algorithm runs, the better the quality of the solution. The concretization process is done in a way to assure the ability to generate trajectories that will get arbitrarily close to the optimal one.

Figure 11:
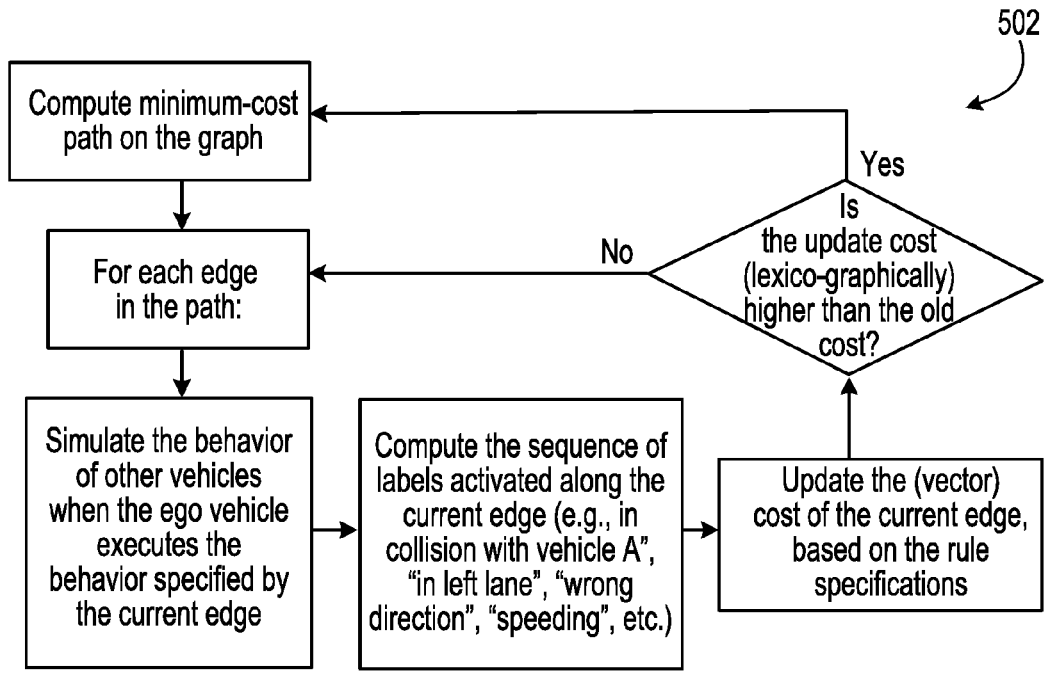
FIG. 11 is a flow diagram of an assessment process.

E. As shown also in FIG. 11, an assessment process 130, which assigns to and updates a cost 132 associated with each of the edges in the directed graph created by the concretization process and uses the costs assigned to the edges to compute the minimum cost path through the directed graph. The cost evaluation is based on the output of the simulator and labeler processes, which provide the predicted physical trajectory and estimates of the vehicle's future state and of the future states of nearby vehicles and obstacles in the world state 88, combined with the sequence of labels 121 describing the logical trajectory of the ego vehicle.

The assessment process then evaluates the combined physical and logical trajectories for the various edges against a set of prioritized and weighted rules (including applicable driving rules or rules of operation) 140 expressed in a formal language such as Linear Temporal Logic (LTL), Computation Tree Logic (CTL*), or µ-calculus. We have used LTL for convenience.

For purposes of prioritization, two rules, say A and B, are pre-assigned different priorities if any violation of B is preferable to any violation of A (in which case A has a higher priority). For example, a rule of the form "do not collide with other vehicles" has higher priority than a rule of the form "remain in the rightmost lane". Two rules are assigned the same priority and possibly different weights if there is a level of violation of rule A that is "equivalent" to a level of violation of rule B; for example, "remain in the rightmost lane" and "maintain the set cruise speed" (in order to maintain the cruise speed when a slower vehicle is traveling ahead, the vehicle may decide to move to the left lane in order to take over the slower vehicle). Rules are prioritized and weighted according to the rules of operation set forth in the relevant bodies of regulations and by the preferences of the users/operators.

LTL is known to have enough expressive power to represent all so-called omega-regular expressions on discrete-time transition systems (such as the directed graph described in this document), including all driving rules. In addition, known computer algorithms can convert automatically any LTL formula into an equivalent finite-state automaton, thus removing a common source of error and complexity in the software development process.

At each iteration (that is, at each time step), the assessment process updates the costs of all edges in the directed graph constructed by the concretization process as of that time step, starting from its root, and based on the latest world state and on the outputs received in response to new calls (requests for service) to the simulation and labeler processes.

In some implementations, the assessment process executes the following steps. The root of the directed graph is initialized as the latest world state 88 returned by the world model process 84. Then, edges in the directed graph are updated, e.g., according to a best-first order (or other order guaranteeing complete coverage of the directed graph), by calling the simulator and labeler processes for each of the edges. For each formula of interest (e.g., for each rule of operation) for each of the edges, the resulting label sequence from the labeler process is used to update the state of a corresponding finite state automaton. The updated state is added to information stored for the directed graph's vertex that is at the end of the edge. The violation cost of the formula (a rule of operation expressed as an LTL formula) along a given path is proportional to the number of labels that need to be removed from the labeled world trajectories in the path for that formula's finite state automaton to accept the transition. The cost of each edge is an array containing several numerical entries, each corresponding either to a rule priority level and proportional to the extent by which the rule(s) of that priority are violated or to a function of the vehicle's trajectory (e.g., path length, turning angle, fuel consumption, etc.) or a combination of the two. The final step in the assessment process is to update the cost of each edge based on the updated world trajectories. The result of the assessment process is a directed graph in which the costs of all of the edges have been updated.

As a feature of the steps of the assessment process, the cost of each edge can be influenced by statistical, probabilistic, or worst-case estimates of events such as the ego vehicle colliding with other vehicles or obstacles, the ego vehicle violating a driving rule, or other events relevant to the operation of the vehicle.

In some implementations, given the set of candidate trajectories, the assessment process can quickly find which one is the best according to criteria that are encoded in a cost that can be comprised of several components. The cost can be expressed as an array of the form (10.1, 2, 0), where each component gives the cost incurred for a particular criterion. For example, the first component could be the path length, the second could be the number of lane boundaries to be crossed, and the third could be the number of expected collisions. The costs are compared following a lexicographic ordering in which, for example, the later entries have higher priority than the earlier ones. For example a trajectory with cost (25, 4, 0) is considered preferable to one with cost (10, 2, 1), because the latter will cause a collision, even though it is shorter. A trajectory with cost (12, 0, 0) will be preferable to both. This concept allows the system to systematically compute trajectories that satisfy all driving rules that the vehicle is able to satisfy (allowing for some minimal violation), thus providing predictable and graceful performance degradation instead of, e.g., aborting, when some rule needs to be violated.

Intuitively, what we have described can be considered in the following terms. The problem is one of the kind that is at the head of the NP complexity class. These are problems for which, given some oracle, or non-deterministic (N) process, that generates some candidate solution, it is easy to check whether the candidate is in fact a solution (easy=(P) olynomial time). The concretization process is a "non-deterministic" part of the technique described above: it is an oracle that generates a large number (hundreds or thousands) of candidate solutions per second, covering the space of all possible solutions efficiently. The assessment process checks these candidates quickly.

An executive process (described below) then picks the best candidate and feeds it to the Controller process, while monitoring its execution.

Figure 12:
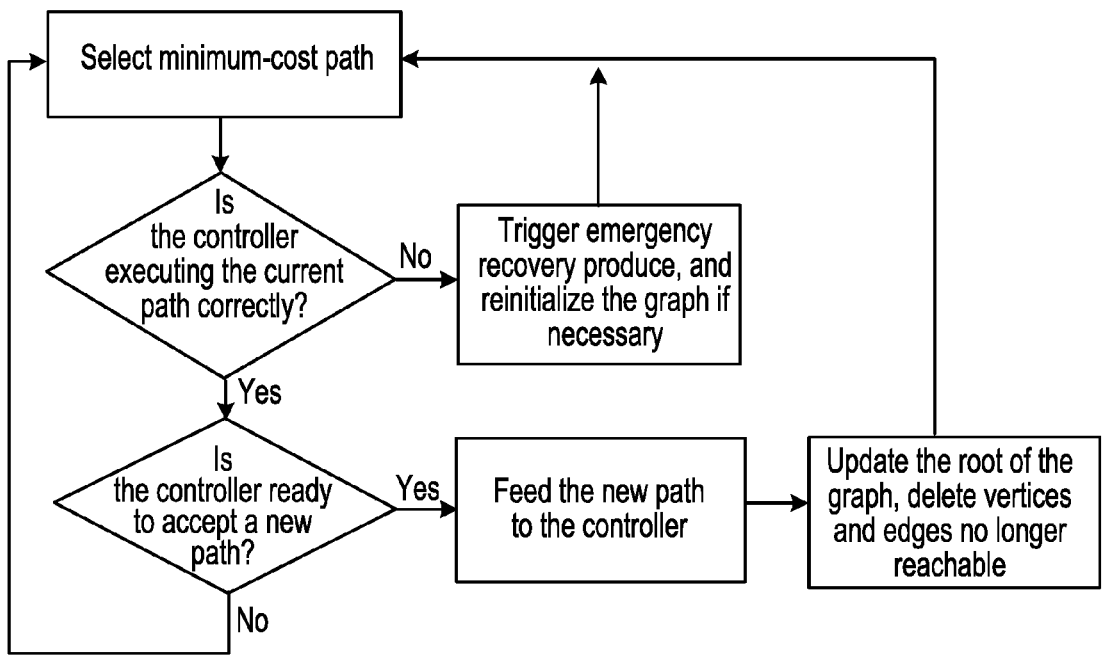
FIG. 12 is a flow diagram of an executive process.

F. As shown also in FIG. 12, an executive process 150, which selects a minimum-cost path 152 of the updated edges and vertices on the graph created by the concretization process, according to the updated costs assigned in the assessment process. The feedback control policy corresponding to the next transition of the minimum-cost path is provided to the controller process 170 (described below) for execution. The executive process also monitors the controller process for correct execution of the feedback control policy corresponding to the minimum cost path. At any time when the controller process completes the execution of a feedback control policy and accepts a new one, the executive process updates the directed graph by setting as the new root of the directed graph the destination vertex of the first edge of the minimum-cost path and removes from the directed graph all vertices and edges that cannot be reached along a path starting at the new root.

G. A controller process 170 that implements each feedback control policy provided by the executive process. As noted earlier, each of the feedback control policies provides control inputs (e.g., steering angle, acceleration, and braking commands, as well as auxiliary commands such as turn indicator activation) to realize a desired behavior of the vehicle, given the world state information provided by the world model process 84. The controller process subscribes to messages from the world model process 84 and from the executive process 150. The world model process messages contain up-to-date information about the vehicle's state and the state of the environment (nearby vehicles, etc.). The executive process messages contain descriptions of the feedback control policies to be executed by the controllers. Based on the world state, and the commands specified in the given feedback control policy, the controller process determines the input control signals to be sent to on-board actuators (e.g., steering angle, throttle setting, brake setting, etc.). Examples of known methods for computing feedback control policies to control the motion of a vehicle include R. Wallace, A. Stentz, C. E. Thorpe, H. Maravec, W. Whittaker, and T. Kanade, "First results in robot road-following.," in IJCAI, pp. 1089-1095, 1985. O. Amidi and C. E. Thorpe, "Integrated mobile robot control," in Fibers' 91, Boston, Mass., pp. 504-523, International Society for Optics and Photonics, 1991. B. d'Andréa Novel, G. Campion, and G. Bastin, "Control of nonholo-nomic wheeled mobile robots by state feedback linearization," The International journal of robotics research, vol. 14, no. 6, pp. 543-559, 1995. Y. Kanayama, Y. Kimura, F. Miyazaki, and T. Noguchi, "A stable track-ing control method for an autonomous mobile robot," in International Conference on Robotics and Automation, pp. 384-389, IEEE, 1990. Z.-P. Jiang and H. Nijmeijer, "Tracking control of mobile robots: a case study in backstepping," Automatica, vol. 33, no. 7, pp. 1393-1399, 1997. A. Ollero and O. Amidi, "Predictive path tracking of mobile robots. application to the CMU Navlab," in 5th International Conference on Advanced Robotics, vol. 91, pp. 1081-1086, 1991. P. Falcone, M. Tufo, F. Borrelli, J. Asgari, and H. E. Tseng, "A linear time varying model predictive control approach to the integrated vehicle dynamics control problem in autonomous systems," in 46th Conference on Decision and Control, pp. 2980-2985, IEEE, 2007. J. P. Hespanha et al., "Trajectory-tracking and path-following of under-actuated autonomous vehicles with parametric modeling uncertainty," Transactions on Automatic Control, vol. 52, no. 8, pp. 1362-1379, 2007. A. P. Aguiar, J. P. Hespanha, and P. V. Kokotovic', "Path-following for nonminimum phase systems removes performance limitations," Automatic Control, IEEE Transactions on, vol. 50, no. 2, pp. 234-239, 2005. H. K. Khalil and J. Grizzle, Nonlinear systems, vol. 3. Prentice hall New Jersey, 1996. A. L. Rankin, C. D. Crane III, D. G. Armstrong II, A. D. Nease, and H. E. Brown, "Autonomous path-planning navigation system for site characterization," in Aerospace/Defense Sensing and Controls, pp. 176-186, International Society for Optics and Photonics, 1996. J. Wit, C. D. Crane, and D. Armstrong, "Autonomous ground vehicle path tracking," Journal of Robotic Systems, vol. 21, no. 8, pp. 439-449, 2004. C. E. Garcia, D. M. Prett, and M. Morari, "Model predictive control: theory and practice-a survey," Automatica, vol. 25, no. 3, pp. 335-348, 1989. E. F. Camacho and C. B. Alba, Model predictive control. Springer Science & Business Media, 2013. D. Q. Mayne, J. B. Rawlings, C. V. Rao, and P. O. Scokaert, "Con-strained model predictive control: Stability and optimality," Automatica, vol. 36, no. 6, pp. 789-814, 2000.

The executive process monitors the controller process for correct execution. If the actual trajectory of the ego vehicle deviates by more than a threshold amount (set, for example, to indicate unacceptable risk of loss of control, rule violation, or collision) From the planned optimal trajectory (or if other vehicles behave unexpectedly), an emergency procedure is triggered, and the directed graph is reinitialized. If the controller process is not then executing a feedback control policy or is ready to accept a new feedback control policy, the executive process computes the minimum-cost path on the directed graph and feeds it to the controller process. Then the executive process first moves the root of the directed graph to the end point of the first edge in the minimum-cost path and deletes from the directed graph any vertex and edge that is not reachable from the new root. The executive process is then reiterated.

In some implementations, to generate a sequence of control actions based on both real-time sensor data and historical information, the world model, concretization, assessment, executive, and control processes can be executed concurrently and asynchronously (that is, not with the same "clock"; for each iteration of, e.g., the assessment process, there may be several iterations of the concretization process.) The simulator and labeler processes can be executed on request by the other processes. The world model and control processes can be run at a rate (that is, they iterate at successive times) determined, respectively, by the available sensors' sampling frequencies, and by the bandwidths of the available actuators and of the vehicle's dynamics. The world model and control processes use known methods for estimation, perception, and control. The concretization, assessment, and executive processes are iterated as frequently as possible (on a best effort basis) but at a possibly lower rate than for the world model and control processes, depending on the available computational resources.

Communication among processes can be implemented by known inter-process and inter-thread message-passing mechanisms, including, for example, shared memory, and publish/subscribe protocols.

Figure 10:
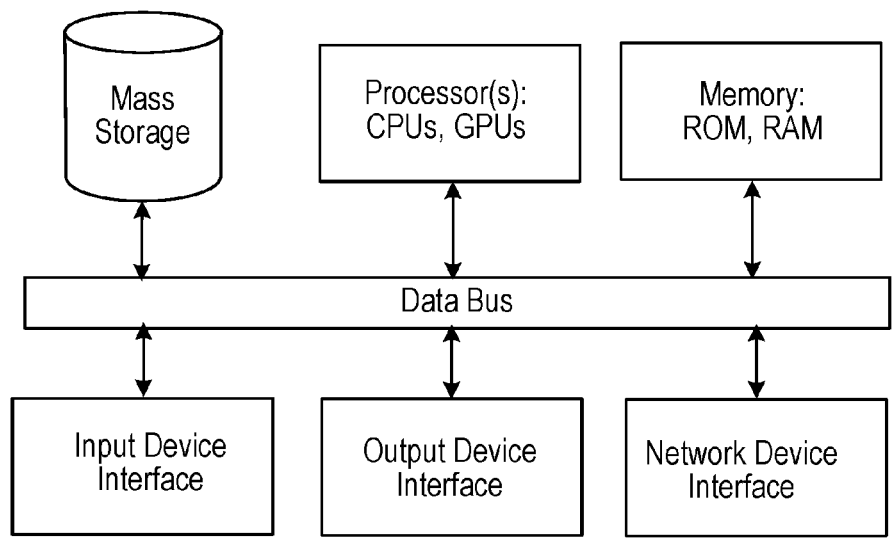
FIG. 10 is a block diagram of a computer system.

FIG. 10 shows typical components of a computer system and their relationships that could be used in the vehicle 10.

Driver Performance Monitoring

In the discussion above, we have described the system in which, at each time step of a succession of time steps, and optimal trajectory is determined and a feedback control corresponding to a current piece of the optimal trajectory is executed to control operation of the vehicle in an effort to cause it to traverse the optimal trajectory. As time passes, the self-driving vehicle follows an optimal trajectory to reach a destination.

At least some of the processes described above also can be used in a different context, one in which the vehicle is driven by a person and at each time step of a succession of time steps, a retrospective analysis can be done of the performance of the driver over a period of time as represented by a comparison of metrics applied to the actual trajectory of the driven vehicle with metrics applied to the optimal trajectory that was determined during that period of time. Among other things, the analysis can be used to monitor the performance of the driver and provide useful information to the driver and to other parties.

Figure 16:
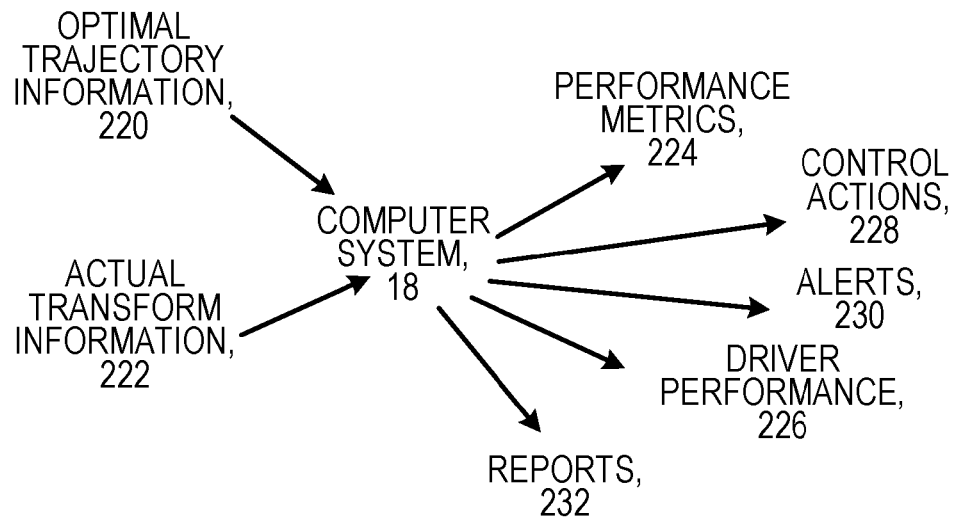
FIG. 16 is a schematic diagram of processing in a driver performance system.
Figure 17:
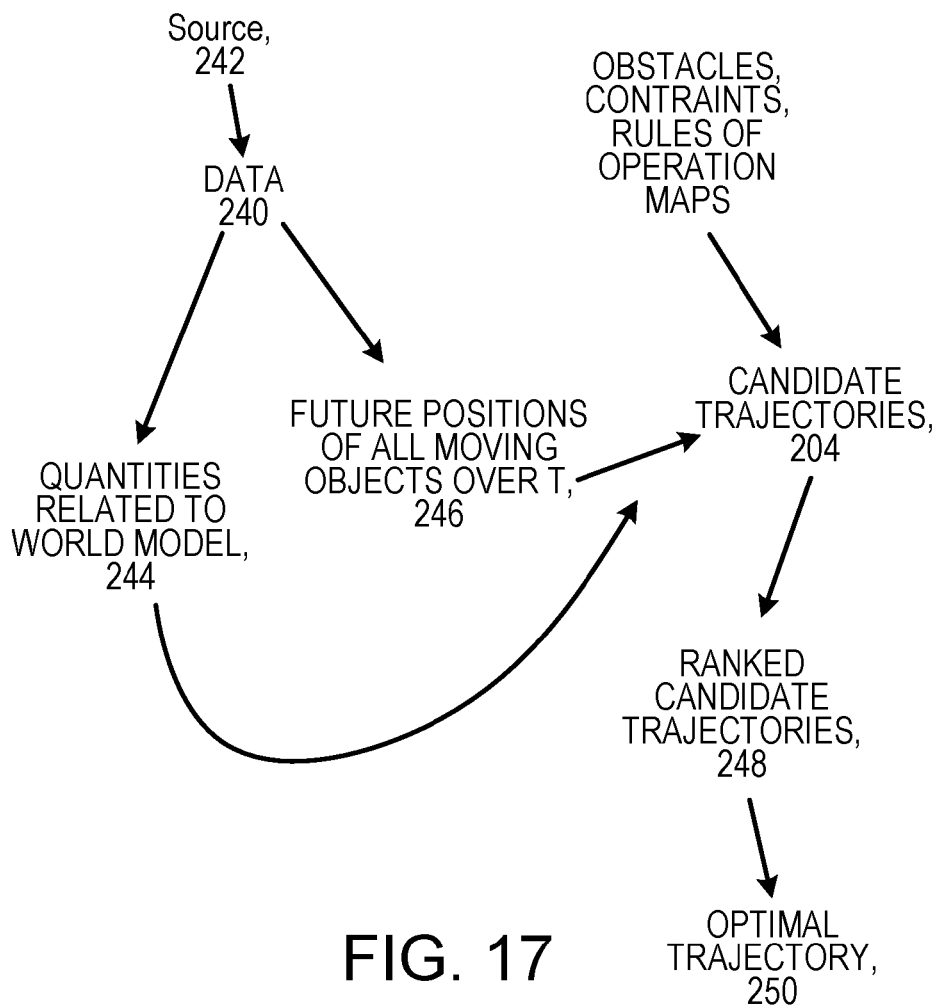
FIG. 17 is a schematic diagram illustrating the generation of an optimal trajectory.

That is, as shown in FIG. 16, optimal trajectory information 220 and actual trajectory information 222 can be used to observe, determine, analyze, and report, among other things, the performance of a driver 226 of a vehicle.

We use the term "driver performance" broadly to include, for example, any aspect of how a human being controls a vehicle during operation, including, for instance, the quality, effectiveness, or style (or a combination of them) of the human's control in absolute terms or relative to standards, models, or examples and with respect to one or more of a variety of metrics and factors used to characterize driver performance.

In some implementations, to evaluate driver performance, the computer system 18 located on a vehicle 10 (which could be a self-driving vehicle that is for the moment under the control of a driver, or a non-self-driving vehicle) computes performance metrics 224 by analyzing both a predicted "optimal trajectory" 220 and the vehicle's actual trajectory 222. We use the term "optimal trajectory" broadly to include, for example, any path or course or route of the vehicle that would be ideal, or desirable, or useful and in some cases would be the best route taking account of one or more of a variety of appropriate factors.

In some examples, the computed performance metrics can be used to activate steering or braking control actions 228 or both that aim to modify the vehicle's motion in a computer-controlled fashion to ensure vehicle safety. In addition, the metrics can be used to assess the driver's driving performance, the likelihood of causing an accident, or the likelihood of violating a traffic law, among other things.

Based on analysis of the metrics, alerts 230 to the driver related to either or both good and bad driving performance can be shown on an in-vehicle display. A report 232 on the driver's behavior can also be wirelessly transmitted to a recipient (for example, a trusted recipient) either in a push mode or upon request by authorized and authenticated users. These users can include any of the following or combination of two or more of them: the driver, family members (parents monitoring the acquisition of driving skills by their child), social networks (e.g., young drivers "competing" on their safety or "eco-friendliness" levels with one another), rental vehicle operators, or insurance agencies, among others.

As explained earlier with respect to FIG. 4 and as shown in FIG. 16, when the world model process 84 is executed, data 240 is captured from all available vehicle sensors and data sources 242 and processed to compute some or all of the following quantities 83.

For driver performance purposes, each of the quantities is calculated at each time step k while the vehicle is in operation. The intervals that separate successive time instants when the quantities are calculated can range from 0.2 to 2 seconds, indicatively.

1. The quantities 244 referred to above in the section related to the world model.

2. The future positions 246 of all moving objects (e.g., vehicles, cyclists, pedestrians, etc.) are predicted over a configurable time horizon T (e.g., a period of time from the current time step k to a future time step k+T) using known techniques [Aoude, Georges, Joshua Joseph, Nicholas Roy, and Jonathan How. "Mobile agent trajectory prediction using Bayesian nonparametric reachability trees." In Proceedings of AIAA Infotech@ Aerospace (2011): 1587-1593., Demiris, Yiannis. "Prediction of intent in robotics and multi-agent systems." Cognitive Processing, 8, no. 3 (2007): 151-158., Morris, Brendan Tran, and Mohan Manubhai Trivedi. "Learning, modeling, and classification of vehicle track patterns from live video." IEEE Transactions on Intelligent Transportation Systems, 9.3 (2008): 425-437.]. The future positions of all moving objects are stored in a memory unit 65 on the vehicle. The time horizon T can be a time period within a typical reasonable range of 2-5 seconds (or more or less as mentioned earlier).

Figure 14:
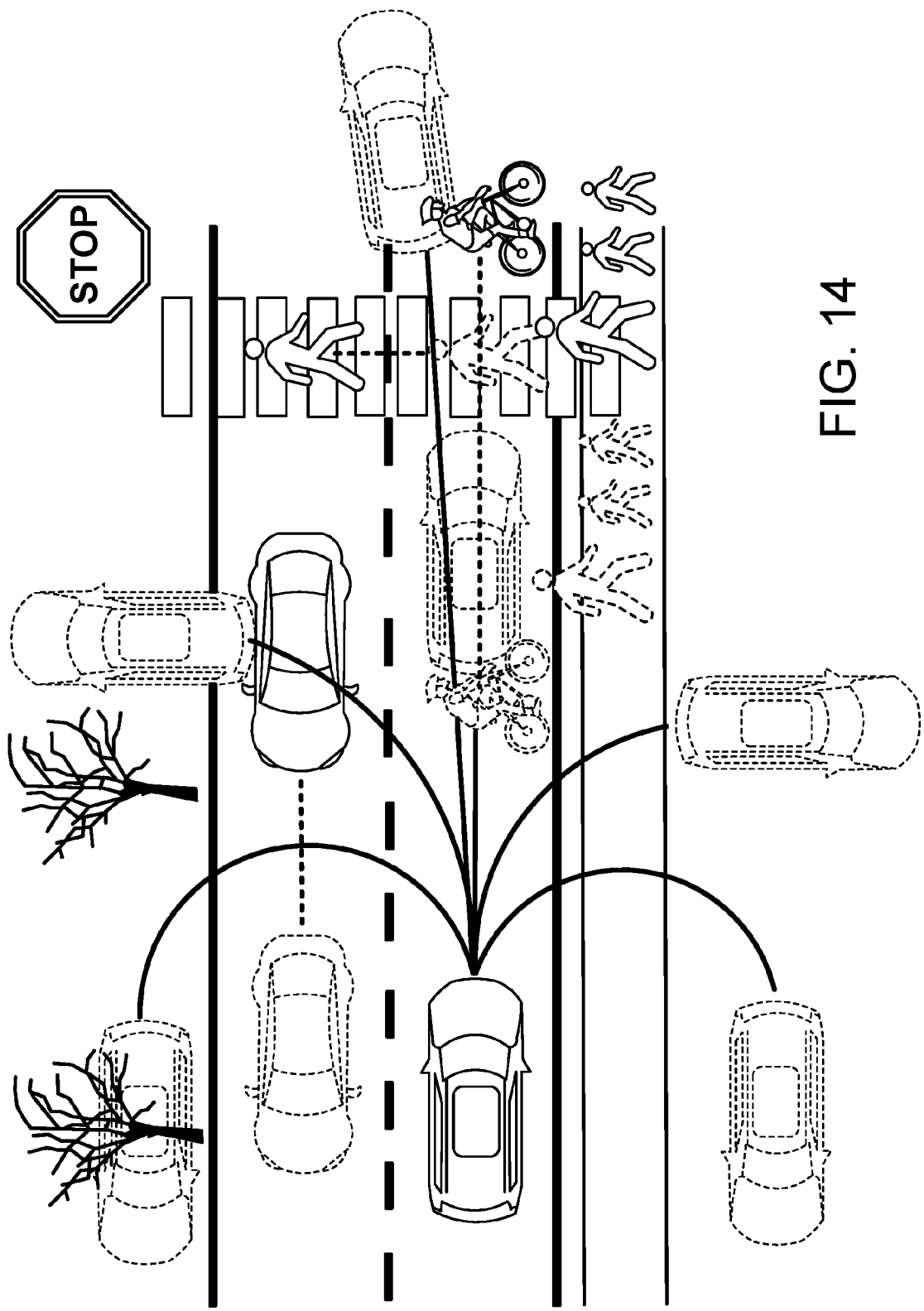
FIG. 14 is a schematic view of candidate trajectories.

3. As shown in FIG. 14, processes 202 (of the kind discussed earlier with respect to self-driving vehicles) running on the computer 18 generate candidate trajectories 204 (e.g., time-parameterized paths) that the ego vehicle may follow through the environment during the configurable time horizon T. The generated candidate trajectories are stored in a memory unit on the vehicle.

Generation of such candidate trajectories can be accomplished by a variety of known techniques, including techniques relying on state lattices, graph search techniques, or techniques utilizing randomized planning methods such as probabilistic road maps or rapidly-exploring random trees [S. M. LaValle. Planning algorithms. Cambridge University Press, Cambridge, UK, 2006. L. E. Kavraki, P. Svestka, J. C. Latombe, and M. H. Overmars. Probabilistic roadmaps for path planning in high-dimensional configuration spaces. IEEE Transactions on Robotics and Automation, 12(4):566-580, 1996. J. C. Latombe. Robot Motion Planning. Kluwer Academic Publishers, Boston, Mass., 1991. J. T. Betts. Survey of numerical methods for trajectory optimization. AIAA Journal of Guidance, Control, and Dynamics, 21(2): 193-207, March-April 1998. S. Karaman and E. Frazzoli. Sampling-based algorithms for optimal motion planning. Int. Journal of Robotics Research, 30(7):846-894, June 2011.]. Such planning methods typically consider the locations of obstacles relative to the vehicle when generating candidate trajectories, so that candidate trajectories that would result in collision with an obstacle(s) are removed from consideration.

During the candidate trajectory generation process, however, it is also desirable to consider driving behavior constraints arising from road markings, traffic signals, traffic signs, and relevant rules of operation, so that generated candidate trajectories are likely not only to be collision-free, but also free of violation of rules of operation. A method for trajectory generation that satisfies these properties is described above.

4. The candidate ego vehicle trajectories are evaluated and ranked according to their quality or desirability. More precisely, each candidate trajectory is evaluated according to a set of performance metrics that may include, but are not limited to, any one or more of the following:

a. Driver safety as determined by analysis of one or any combination of two or more of the following:

i. A safety metric (a) computed as a number of events for which the candidate trajectory would cause the ego vehicle to fail to come to a complete stop in a region governed by a stop signal or sign.

ii. A safety metric (b) computed as a number of events for which the candidate trajectory would cause the ego vehicle to fail to yield to other vehicles, cyclists, pedestrian, or other dynamic obstacles when located in a region governed by yield signal or sign.

iii. A safety metric (c) computed as a number of events for which the candidate trajectory would cause the ego vehicle to fail to yield at a pedestrian crosswalk when pedestrians or cyclists were present in the crosswalk.

iv. A safety metric (d) computed as a number of events for which the candidate trajectory would cause the ego vehicle to collide with any part of a static or dynamic obstacle identified in 1, or any other object or road feature.

v. A safety metric (e) computed as a number of events for which the candidate trajectory would cause the ego vehicle to cross an unbroken lane marker or depart the drivable road surface.

vi. A safety metric (f) computed as a number of events for which the candidate trajectory would cause the ego vehicle to fail to properly obey precedence at an intersection.

vii. A safety metric (g) computed as a number of events for which the candidate trajectory would cause the ego vehicle to fail to properly obey a rule of operation not described in i through vi.

viii. A safety metric (h) computed as the maximum of the percent difference between the maximum vehicle speed at a given point along the candidate trajectory and the maximum speed limit at the same point on the candidate trajectory.

ix. A safety metric (i) computed as the inverse of the minimum of the ratio of the headway distance to the leading vehicle along the candidate trajectory and the difference between the ego vehicle speed at a given point and the speed of the leading vehicle at the same point on the candidate trajectory. This metric is also known as the "time to collision" [LaValle2006].

x. A safety metric (j) computed as a number of events for which the candidate trajectory would cause the ego vehicle to exceed a pre-defined number of transitions across neighboring lanes of travel and therefore exhibit "weaving" behavior.

xi. A safety metric (k) computed as the ratio of the maximum lateral acceleration that would be required by the ego vehicle in order to accurately track the candidate trajectory (computed as the square of the vehicle velocity at a given point on the trajectory divided by radius of curvature at the same point on the given trajectory) to the maximum allowable lateral acceleration given the current environmental conditions.

xii. A safety metric (l) computed as the ratio of the maximum longitudinal acceleration that would be required by the ego vehicle in order to accurately track the candidate trajectory (computed as the time derivative of the longitudinal velocity at a given point on the trajectory) to the maximum allowable longitudinal acceleration given the current environmental conditions.

b. Passenger comfort as determined by analysis of one or any two or more of the following:

i. A longitudinal comfort metric (a) which is computed as the ratio of the maximum longitudinal acceleration that would be required by the ego vehicle in order to accurately track the candidate trajectory (computed as the time derivative of the longitudinal velocity at a given point on the trajectory) to a selected maximum comfortable longitudinal acceleration value.

ii. A longitudinal comfort metric (b) which is computed as the ratio of the maximum longitudinal jerk that would be required by the ego vehicle in order to accurately track the candidate trajectory (computed as the time derivative of the longitudinal acceleration at a given point on the trajectory) to a selected maximum comfortable longitudinal jerk value.

iii. A lateral comfort metric (a) which is computed as the ratio of the maximum lateral acceleration that would be required by the ego vehicle in order to accurately track the candidate trajectory (computed as the square of the vehicle velocity at a given point on the trajectory divided by radius of curvature at the same point on the given trajectory) to a selected maximum comfortable lateral acceleration value.

iv. A lateral comfort metric (b) which is computed as the ratio of the maximum lateral jerk that would be required by the ego vehicle in order to accurately track the candidate trajectory (computed as the time derivative of the lateral velocity at a given point on the trajectory) to a selected maximum comfortable lateral jerk value.

c. Environmental impact as determined by analysis of one or more of the following:

i. A fuel consumption metric (a) which is computed as the length of a given candidate trajectory divided by the minimum length of all candidate trajectories.

ii. A fuel consumption metric (b) which is computed as the ratio of the estimated fuel consumption (computed based on vehicle data and a pre-defined model) required to accurately track the candidate trajectory to a baseline fuel consumption level for the traveled route at the current travel time, which is computed based on data from a driver database and a pre-defined model.

iii. A vehicle wear and tear metric, which is computed as the ratio of the vehicle wear and tear that would be experienced by the ego vehicle over the candidate trajectory (computed based on vehicle data and a pre-defined model) to a baseline wear and tear level for the traveled route and time, which is computed based on data from a driver database and a pre-defined model.

(Note that these metrics some cases differ from the costs that were used to identify an optimal trajectory in the case of a self-driving vehicle.)

In some implementations, an optimal trajectory 250 is identified as one that is deemed most desirable, as determined by analysis of some combination (e.g., a weighted sum) of the quantitative metrics described in a through c. Typically, the candidate trajectory that exhibits the minimum value of the weighted sum of all performance metrics is deemed the optimal trajectory. The optimal trajectory and its associated performance metric values are stored in a memory unit on the vehicle.

The specific metric calculations described above are intended to be representative, and are not the only useful metrics for a particular driver performance characteristic. Other definitions of an optimal trajectory could be used, and the optimal trajectory could be determined by other computations.

The computations in sections 1 through 4 above are repeated at brief intervals of regular duration ("time steps") 0.2-2 seconds. In some cases the repetition can be at intervals that are smaller or larger than the indicated range. The result of the computations done at each time step k includes an optimal trajectory from the position of the vehicle at time k to the position of the vehicle at time k+T.

Figure 13:
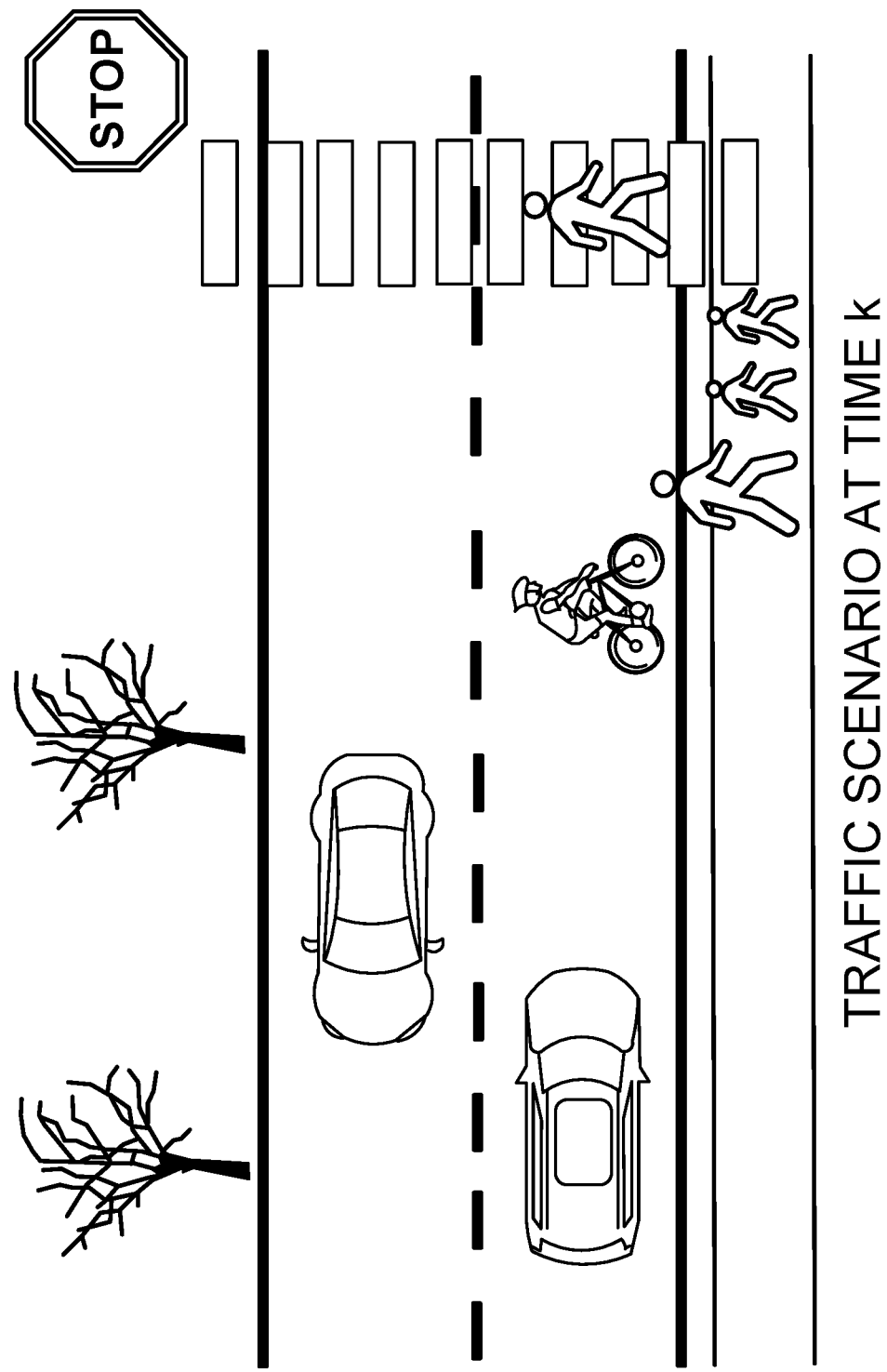
FIG. 13 is a schematic view of a traffic scenario.
Figure 15:
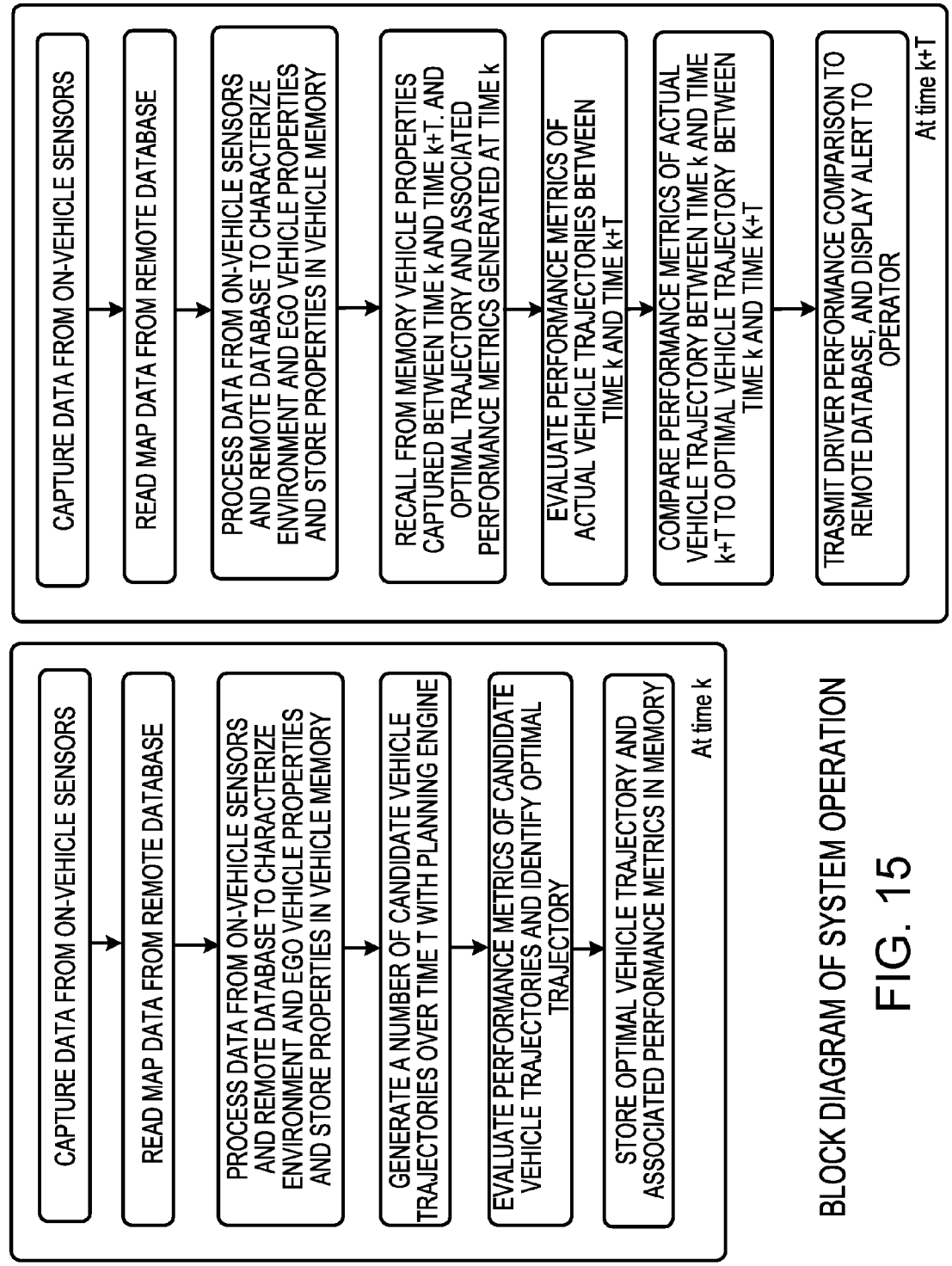
FIG. 15 is a block diagram of a driver performance system.

With reference to FIG. 13 and the left side of FIG. 15, at each time step k, the system also knows and records the actual position of the ego vehicle and the actual motion characteristics of other vehicles, cyclists, pedestrians, and other obstacles in the environment of the vehicle. Together this information amounts to, among other things, and actual trajectory of the ego vehicle during the time period T.

As shown in the right side of FIG. 15, at each time k+T, all data described above for each time step between time k and time k+T—representing the known actual travel trajectory of the ego vehicle and actual motion characteristics of other vehicles, cyclists, pedestrians, and other obstacles in the environment—are analyzed retrospectively using the performance metrics described above. In this analysis, the actual ego vehicle trajectory (not the optimal candidate trajectory) is the subject of analysis. This results in an analysis of the driver's actual performance over the time interval between time k and time k+T.

The performance metrics described above for the driver's actual performance over the time interval between time k and time k+T can then be individually compared to the performance metrics described above for the optimal trajectory between time k and time k+T. Various methods can be used for quantifying the driver's performance, including but not limited to one or any combination of two or more of the following:

1. Individual metrics for the driver's actual performance can be compared to the same metrics for the optimal trajectory.

a. If the percent difference of the metrics exceeds a configurable percentage (i.e., a threshold performance level), the driver's driving performance in that specific criteria is labeled as poor.

b. If the percent difference of the metrics is less than a configurable percentage (i.e., a threshold performance level), the driver's driving performance in that specific criteria is labeled as good.

2. The sum of all metrics for the driver's actual performance can be compared to the sum of all metrics for the optimal trajectory.

a. If the percent difference of the summed metrics exceeds a configurable percentage (i.e., a threshold performance level), the driver's general driving performance is labeled as poor over the time interval time k to time k+T.

b. If the percent difference of the summed metrics is less than a configurable percentage (i.e., a threshold performance level), the driver's general driving performance is labeled as good over the time interval time k to time k+T.

As a result, the performance of the human driver can be assessed in a manner that considers relevant information about traffic and environmental conditions.

A wide variety of other criteria, computations, and analysis, and combinations of them, can form the basis of one or more conclusions about the performance of the human driver.

In some implementations, an in-vehicle display provides alerts to the driver related to both good and bad driving performance identified by the previously described methods. Warnings (or compliments) for poor (or good) driving performance or both can be displayed on the in-vehicle display for specific identified driving errors related to the metrics described above and derived from the individual performance metric analysis described above.

In some implementations of the display, easy to understand icons or other indicators, for example, colored red, might be displayed when a specific identified driving error is committed. For example, if the driver fails to yield at a yield sign, a red yield sign may be displayed on the in-vehicle display.

Also, a general "How am I driving?" indicator can be displayed on the in-vehicle display related to the summed performance metric analysis described above. In one embodiment of the display, a happy face might be displayed when driving performance is good, and a sad face displayed when driving performance is bad, with a range of expressions displayed when driving performance is variable.

The computed driver performance metrics can also be transmitted wirelessly to a centralized data storage repository. Another process distributes these metrics to authenticated authorized users.

A wide variety of computer systems, hardware, firmware, sensors, networks, software, and devices can be used to implement the system and techniques that we have described.

For example, the memory that we have referred to can store program instructions and data used by the processor. The memory may be a suitable combination of random access memory and read-only memory, and may host suitable program instructions (e.g. firmware or operating software), and configuration and operating data and may be organized as a file system or otherwise. The stored program instructions may include one or more authentication processes for authenticating one or more users. The program instructions stored in the memory of the panel may store software components allowing network communications and establishment of connections to the data network. The software components may, for example, include an internet protocol (IP) stack, as well as driver components for the various interfaces. Other software components suitable for establishing a connection and communicating across network will be apparent to those of ordinary skill.

Program instructions stored in the memory, along with configuration data may control overall operation of the system. Server computer systems can include one or more processing devices (e.g., microprocessors), a network interface and a memory.

All or part of the processes that we have described and various modifications can be implemented, at least in part, using a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the processing depicted in the figures does not necessarily require the particular order shown, or sequential order, to achieve desirable results. In addition, other actions may be provided, or actions may be eliminated, from the described processes, and other components may be added to, or removed from, the described systems. Likewise, actions depicted in the figures may be performed by different entities or consolidated.

Elements of embodiments that we have described may be combined to form other embodiments not specifically set forth above. Elements may be left out of the processes, computer programs, Web pages, etc. without adversely affecting their operation. Furthermore, various separate elements may be combined into one or more individual elements to perform the functions described.

Other implementations are also within the scope of the following claims.

The invention claimed is:

1. A method comprising
   autonomously driving a vehicle within an environment to a destination by actions that include:
   generating a finite set of candidate trajectories of the vehicle that begin at a location of the vehicle as of a given time, the candidate trajectories each being based on a sequence of world states at successive times and on transitions between successive states of the sequence, each of the world states comprising a state of the vehicle and a state of the environment as of the location of the vehicle and the corresponding time, the state of the environment comprising states of at least one of another vehicle, a cyclist, a pedestrian, or another obstacle,
   selecting a putative optimal trajectory from among the candidate trajectories based on costs associated with the candidate trajectories, including costs associated with violations of rules of operation of the vehicle, the costs associated with a given trajectory being evaluated based on costs associated with sequences of two or more of the transitions between successive states of the trajectory, and based on the selected putative optimal trajectory, commanding actuators of the vehicle to engage in control actions to drive the vehicle autonomously within the environment toward the destination.

2. The method of claim 1 in which the facilitating of the operation related to control of the vehicle comprises applying a feedback control policy associated with the putative optimal trajectory to control elements of the vehicle the application of the feedback control policy being based on the states of the vehicle and of the environment.

3. The method of claim 1 comprising applying one or more constraints to the finite set of candidate trajectories, the constraints being applied based on the sequence of world states at the successive times.

4. The method of claim 3 in which applying one or more constraints comprises attributing labels to each of the candidate trajectories of the finite set, each of the labels comprising a logical predicate that represent a property of the vehicle based on the candidate trajectory.

5. The method of claim 1 in which the putative optimal trajectory is associated with both speed and direction of the vehicle and selecting the putative optimal trajectory comprises determining a minimum-cost path through a directed graph of which the candidate trajectories comprise edges, the cost of the minimum-cost path comprising a penalty associated with violation of a constraint.

6. The method of claim 1 in which generating a finite set of candidate trajectories of the vehicle comprises applying a model that represents the vehicle's expected response to a given control policy as of the location of the vehicle and the given time, the model representing responses of elements of the environment to the given control policy and the vehicle's expected response as of the location of elements of the environment vehicle.

7. The method of claim 1 in which the costs associated with a given trajectory are based on costs associated with interactions between the states of the vehicle and the states of the environment and the costs are expressed as cost rules in a formal language that enables expression of the cost rules that are interpreted over sequences of two or more world states of a trajectory over time.

8. A method comprising
evaluating driving performance for a vehicle being driven within an environment to a destination, by actions that include:
generating a finite set of candidate trajectories of the vehicle that begin at a location of the vehicle as of a given time, the candidate trajectories each being based on a sequence of world states at successive times and on transitions between successive states of the sequence, each of the world states comprising a state of the vehicle and a state of the environment as of the location of the vehicle and the corresponding time, the environment comprising at least one of another vehicle, pedestrians, cyclists, or other obstacle,
selecting a putative optimal trajectory from among the candidate trajectories based on costs associated with the candidate trajectories, including costs associated with violations of rules of operation of the vehicle, the candidate trajectories taking account of locations of elements of the environment,
monitoring an actual trajectory of the vehicle for a given time period, and
comparing the actual trajectory of the vehicle with the putative optimal trajectory as an indication of the driving performance.

9. The method of claim 8 in which the driving performance comprises a human driver's performance.

10. The method of claim 9 comprising evaluating the driver's performance based on one or more performance metrics.

11. The method of claim 9 comprising displaying information related to the driver's performance on an in-vehicle display.

12. The method of claim 9 comprising transmitting information related to the driver's performance wirelessly to a receiver remote from the vehicle.

13. The method of claim 1 in which the facilitating an operation related to control of a vehicle comprises autonomously driving the vehicle.

14. A method comprising
autonomously driving a vehicle within an environment to a destination by actions that include:
generating a finite set of candidate trajectories of the vehicle as of a given time, the finite set of candidate trajectories belonging to a trajectory space of all possible trajectories of the vehicle,
assessing costs of each of the candidate trajectories, the costs comprising one or more of the following: length, turning angle, or other geometry related costs; acceleration, jerk, control effort, or other dynamic costs; and rule or constraint violations or other logical costs, the costs comprising a total order, and the putative optimal trajectory is selected as one with minimum cost according to the total order,
selecting a putative optimal trajectory from among the candidate trajectories of the finite set based on costs associated with the candidate trajectories, the selected putative optimal trajectory is associated with both speed and direction of the vehicle,
the space of all possible trajectories of the vehicle being sufficiently covered by the generated finite set of candidate trajectories so that the putative optimal trajectory comprises an arbitrarily close approximation to an actual optimal trajectory, and
based on the selected putative optimal trajectory commanding actuators of the vehicle to engage in control actions to drive the vehicle within the environment toward the destination.

15. The method of claim 14 comprising applying one or more constraints to the finite set of candidate trajectories.

16. The method of claim 14 comprising representing the candidate trajectories as edges of a directed graph.

17. The method of claim 14 in which the environment comprises a vehicle.

18. The method of claim 14 in which generating a finite set of candidate trajectories of the vehicle comprises applying a model that represents the vehicle's and the environment's expected response to a given control policy as of the location of the vehicle and a given time.

19. The method of claim 18 in which the control policy comprises a feedback function that determines commands to control the vehicle.

20. A method comprising
evaluating driving performance for a vehicle being driven within an environment to a destination, by actions that include:
generating a finite set of candidate trajectories of the vehicle as of a given time, the finite set of candidate trajectories belonging to a trajectory space of all possible trajectories of the vehicle,
assessing costs of each of the candidate trajectories, selecting a putative optimal trajectory from among the candidate trajectories of the finite set based on costs associated with the candidate trajectories, the space of all possible trajectories of the vehicle being sufficiently covered by the generated finite set of candidate trajectories so that the putative optimal-trajectory comprises an arbitrarily close approximation to an optimal trajectory, monitoring an actual trajectory of the vehicle for a given time period, and comparing the actual trajectory of the vehicle with the putative optimal trajectory as an indication of the driving performance.

21. The method of claim 20 in which evaluating driving performance comprises monitoring a human driver's performance.

22. The method of claim 20 comprising reporting a result of the monitoring of the driver's performance.

23. The method of claim 20 comprising evaluating the driver's performance based on one or more performance metrics.

24. The method of claim 20 comprising assessing the likelihood of an accident occurring.

25. An apparatus comprising an autonomous vehicle comprising controllable devices configured to cause the vehicle to traverse at least part of an optimal trajectory in a manner consistent with control policies and with cost rules that apply to sequences of transitions between successive world states along a world trajectory, a controller to provide commands to the controllable devices in accordance with the world trajectory, sources of information about world states at successive times, and a computational element to iteratively update (a) a set of world states, each of the world states representing a combination of a state of the vehicle, a state of an environment of the vehicle, and a state of at least one other object in the environment based at least in part on the information about world states, and (b) a set of world trajectories, each of the world trajectories representing a sequence of temporal transitions each transition being between one of the world states and another of the world states, each of the iterations of the updating comprising for each of one or more of the world states and for a corresponding vehicle control policy, simulating a candidate trajectory from the world state to a subsequent world state, if the simulated candidate trajectory does not violate a constraint, adding the trajectory to the set of world trajectories to form an updated set of world trajectories, if necessary, adding a new world state to the set of world states corresponding to the transition represented by the simulated candidate trajectory to form an updated set of world states, and determining a minimum-cost path through the updated set of world states and the updated set of world trajectories, the determining including applying cost rules to a sequence of two or more successive transitions of each of the world trajectories, and deliver to the controller information representing a next transition from the current world state to a next world state along the minimum-cost path, for autonomous control of the vehicle.

26. The method of claim 1 in which the costs associated with a given trajectory are based on costs associated with interactions between the states of the vehicle and the states of the environment.

27. The method of claim 1 in which the selected putative optimal trajectory is associated with both speed and direction of the vehicle.

28. The method of claim 14 in which the selected putative optimal trajectory is associated with both speed and direction of the vehicle.

29. The method of claim 1 in which the state of the environment comprises the states of other vehicles, pedestrians, and obstacles as of the corresponding time.

30. The method of claim 2 in which the application of the feedback control policy is based on the states of the vehicle and of the environment.

* * * * *